(12) United States Patent
Oka et al.

(10) Patent No.: US 11,498,210 B2
(45) Date of Patent: Nov. 15, 2022

(54) OBJECT HANDLING DEVICE AND COMPUTER PROGRAM PRODUCT

(71) Applicants: KABUSHIKI KAISHA TOSHIBA, Minato-ku (JP); TOSHIBA INFRASTRUCTURE SYSTEMS & SOLUTIONS CORPORATION, Kawasaki (JP)

(72) Inventors: Yoshifumi Oka, Yokohama (JP); Yasunori Chiba, Yokohama (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 300 days.

(21) Appl. No.: 16/546,771

(22) Filed: Aug. 21, 2019

(65) Prior Publication Data

US 2020/0078941 A1 Mar. 12, 2020

(30) Foreign Application Priority Data

Sep. 10, 2018 (JP) .............................. JP2018-168920

(51) Int. Cl.
*B25J 9/16* (2006.01)
(52) U.S. Cl.
CPC ........... *B25J 9/1653* (2013.01); *B25J 9/1664* (2013.01)
(58) Field of Classification Search
None
See application file for complete search history.

(56) References Cited

U.S. PATENT DOCUMENTS 9,102,055 B1 * 8/2015 Konolige ................. G06T 7/13
9,821,458 B1 * 11/2017 Watts ....................... B25J 9/163
(Continued)

FOREIGN PATENT DOCUMENTS

DE 11 2011 105 151 T5 1/2014
DE 10 2016 001 174 B4 5/2018
(Continued)

OTHER PUBLICATIONS

Pitchaya Kuntanarumitkul, Design for Assembly: Part Orientation, Prediction, and Demonstration, 2015. (Year: 2015).*
(Continued)

*Primary Examiner* — Jeff A Burke
*Assistant Examiner* — Arslan Azhar
(74) *Attorney, Agent, or Firm* — Maier & Maier, PLLC

(57) ABSTRACT

According to one embodiment, an object handling device causes a hand to grasp, convey, and place an object in a container. The object handling device includes one or more processors configured to calculate an expanded interference region by combining an interference region of the hand interfering with another object and an interference region of the grasped object interfering with the another object; calculate at least a placement position between the placement position and a placement posture of the object in the container in accordance with information on an obstacle in the container and the expanded interference region; and calculate a release position at which the hand releases the object, on the basis of the placement position of the object.

5 Claims, 30 Drawing Sheets

(56) References Cited

U.S. PATENT DOCUMENTS

| | | | | |
|---|---|---|---|---|
| 2007/0018059 | A1* | 1/2007 | Woodcock | B65F 1/141 248/133 |
| 2011/0264265 | A1* | 10/2011 | Kanemoto | B25J 9/1666 700/252 |
| 2012/0059517 | A1* | 3/2012 | Nomura | B23P 19/001 901/31 |
| 2014/0309809 | A1* | 10/2014 | Dixon | G05D 1/0022 701/2 |
| 2015/0246778 | A1* | 9/2015 | Koga | G05B 19/4182 700/259 |
| 2016/0016311 | A1* | 1/2016 | Konolige | B25J 15/0616 700/245 |
| 2016/0158936 | A1 | 6/2016 | Moridaira | |
| 2017/0136632 | A1* | 5/2017 | Wagner | B25J 19/04 |
| 2017/0146341 | A1* | 5/2017 | Kimoto | G01B 21/00 |
| 2017/0246744 | A1* | 8/2017 | Chitta | B65G 61/00 |
| 2017/0348856 | A1* | 12/2017 | Nakaya | B25J 9/1664 |
| 2018/0065818 | A1* | 3/2018 | Gondoh | B65G 47/24 |
| 2020/0039668 | A1* | 2/2020 | Que | B65B 5/10 |
| 2020/0047331 | A1* | 2/2020 | Chitta | B25J 9/10 |
| 2020/0198130 | A1* | 6/2020 | Goldberg | B25J 9/1697 |

FOREIGN PATENT DOCUMENTS

| | | |
|---|---|---|
| DE | 10 2017 002 354 A1 | 9/2018 |
| EP | 2 314 425 A2 | 4/2011 |
| JP | 3-111339 A | 5/1991 |
| JP | 2001-206550 A | 7/2001 |
| JP | 2003-172605 A | 6/2003 |
| JP | 5824173 B1 | 11/2015 |
| JP | 2017-61025 A | 3/2017 |
| JP | 6137115 B2 | 5/2017 |
| JP | 6137155 B2 | 5/2017 |
| JP | 2015-85501 A | 5/2018 |
| JP | 6325174 B1 | 5/2018 |

OTHER PUBLICATIONS

Hiroki Kawashima, et al. "The effective bottom-left method to the three-dimensional packing" RIMS Kokyuroku. 2011. vol. 1726. pp. 50-61 (with Computer Generated English translation).

\* cited by examiner

OBLIQUE APPROACH

LATERAL APPROACH

OVERHEAD APPROACH

FIG.23

| OBLIQUE APPROACH | LATERAL APPROACH | OBLIQUE PRESSING | LATERAL PRESSING | APPROACH DIRECTION | PRESSING DIRECTION |
|---|---|---|---|---|---|
| YES | YES / NO | YES | YES / NO | OBLIQUE | OBLIQUE |
| YES | YES / NO | NO | YES | OBLIQUE | LATERAL |
| YES | YES / NO | NO | NO | OBLIQUE | OVERHEAD |
| NO | YES | YES / NO | YES | LATERAL | LATERAL |
| NO | YES | YES / NO | NO | LATERAL | OVERHEAD |
| NO | NO | YES / NO | YES / NO | OVERHEAD | OVERHEAD |

FIG.24

| OBLIQUE APPROACH | LATERAL APPROACH | OBLIQUE PRESSING | LATERAL PRESSING | APPROACH DIRECTION | PRESSING DIRECTION |
|---|---|---|---|---|---|
| YES | YES/NO | YES | YES/NO | OBLIQUE | OBLIQUE |
| YES | YES/NO | NO | YES | OBLIQUE | LATERAL |
| YES | YES/NO | NO | NO | OBLIQUE | OVERHEAD |
| NO | YES | YES/NO | YES | LATERAL | OVERHEAD |
| NO | YES | YES/NO | NO | LATERAL | OVERHEAD |
| NO | NO | YES/NO | YES/NO | OVERHEAD | OVERHEAD |

$\theta_2 \leq \theta_{ref} < \theta_1$

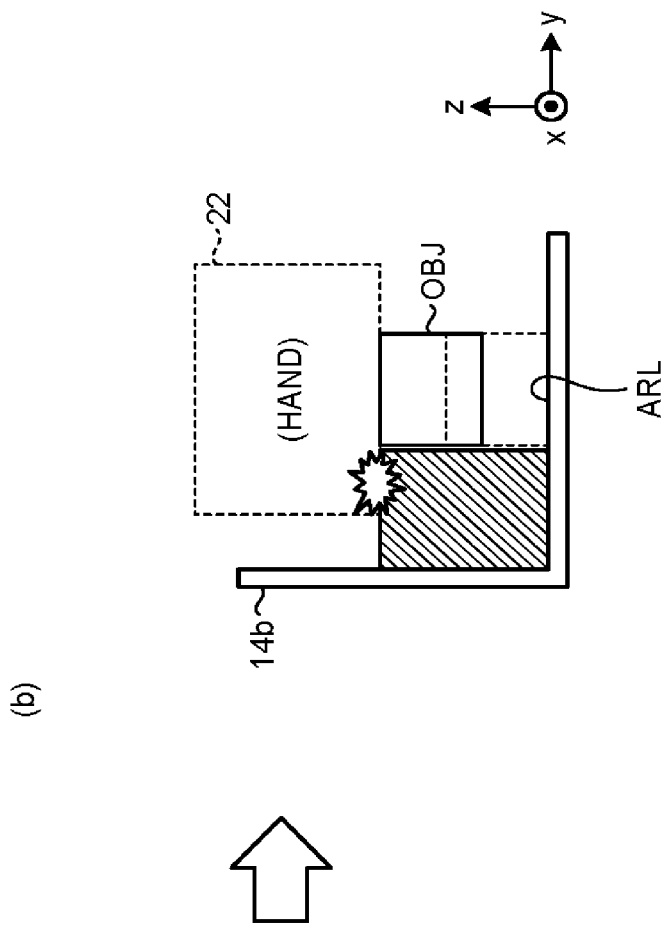
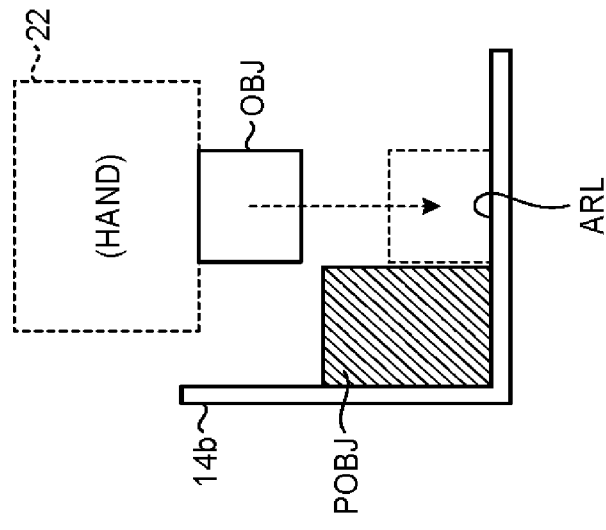
FIG.27

FIG.29
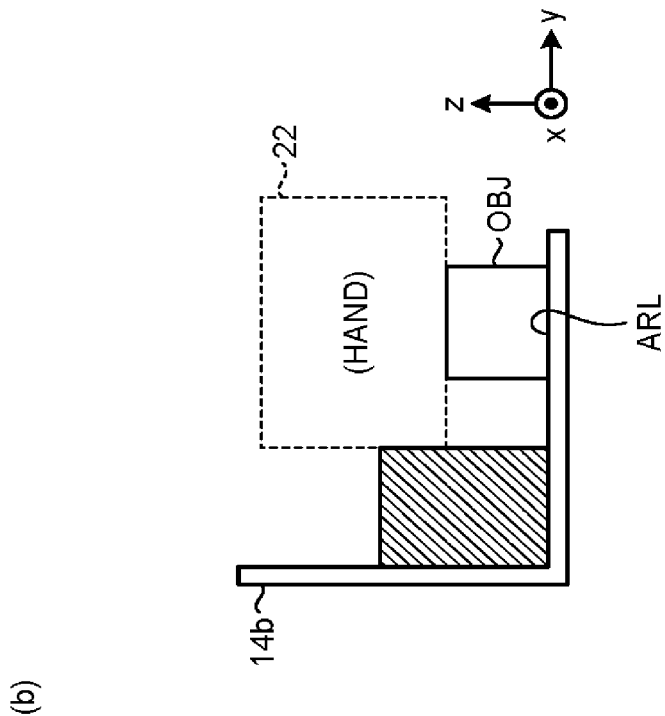
(a)
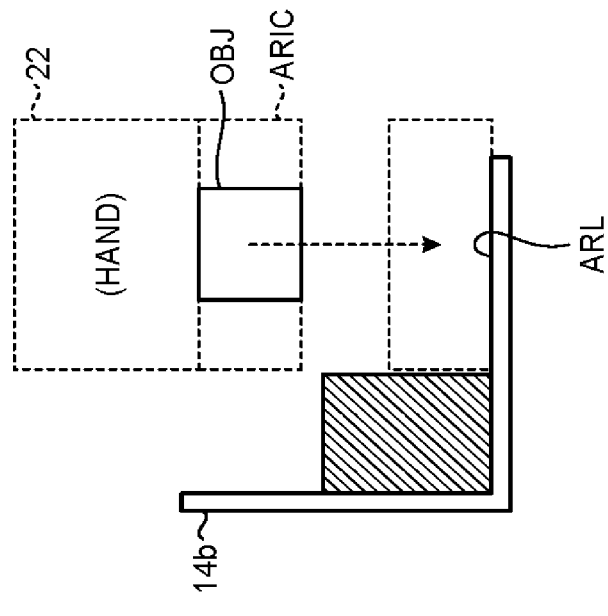
(b)

FIG.33
(a)
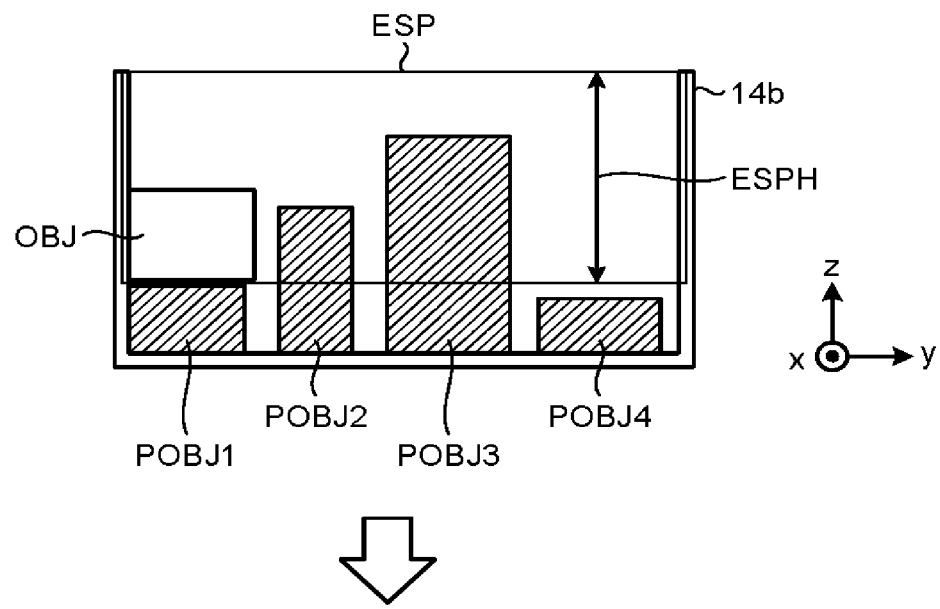
(b)
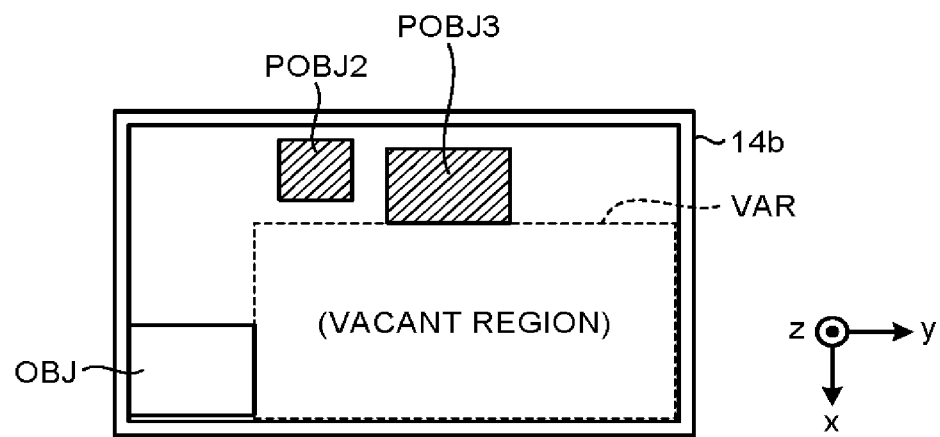

OBJECT HANDLING DEVICE AND COMPUTER PROGRAM PRODUCT

CROSS-REFERENCE TO RELATED APPLICATIONS

This application is based upon and claims the benefit of priority from Japanese Patent Application No. 2018-168920, filed on Sep. 10, 2018, the entire content of which are incorporated herein by reference.

FIELD

Embodiments described herein relate generally to an object handling device and a computer program product.

BACKGROUND

To expand automation in logistics and manufacturing facilities, handling systems using a robot arm are increasingly introduced. For use of a robotic hand to grasp and carry an object into a container, for example, it is preferable for not only the object but also the robotic hand not to interfere with peripheral obstacles.

Methods for checking interference in the motion path of a robot model from CAD data of the robot model are proposed. Such methods, however, require a high implementation cost for model generation and a longer processing time due to the search for interference.

It is thus preferable to provide an object handling device and a computer program product that can grasp and handle an object by an easily feasible, higher-speed method without interference with peripheral obstacles.

BRIEF DESCRIPTION OF THE DRAWINGS

FIG. 23 is a table for setting a pressing direction and an approach direction;

FIG. 24 is another table for setting a pressing direction and an approach direction;

FIG. 27 is an explanatory view of an example that a hand is driven but fails to reach the release position;

FIG. 29 is an explanatory view of an example that the hand is driven and can reach the release position;

FIG. 33 is an explanatory view of a free-space score;

DETAILED DESCRIPTION

According to one embodiment, in general, an object handling device causes a hand to grasp, convey, and place an object in a container, and includes one or more processors configured to calculate an expanded interference region by combining an interference region of the hand interfering with another object and an interference region of the grasped object interfering with the another object; calculate at least a placement position between the placement position and a placement posture of the object in the container in accordance with information on an obstacle in the container and the expanded interference region; and calculate a release position at which the hand releases the object, on the basis of the placement position of the object.

Exemplary embodiment will be described below with reference to the accompanying drawings.

Overall System Configuration

Figure 1:
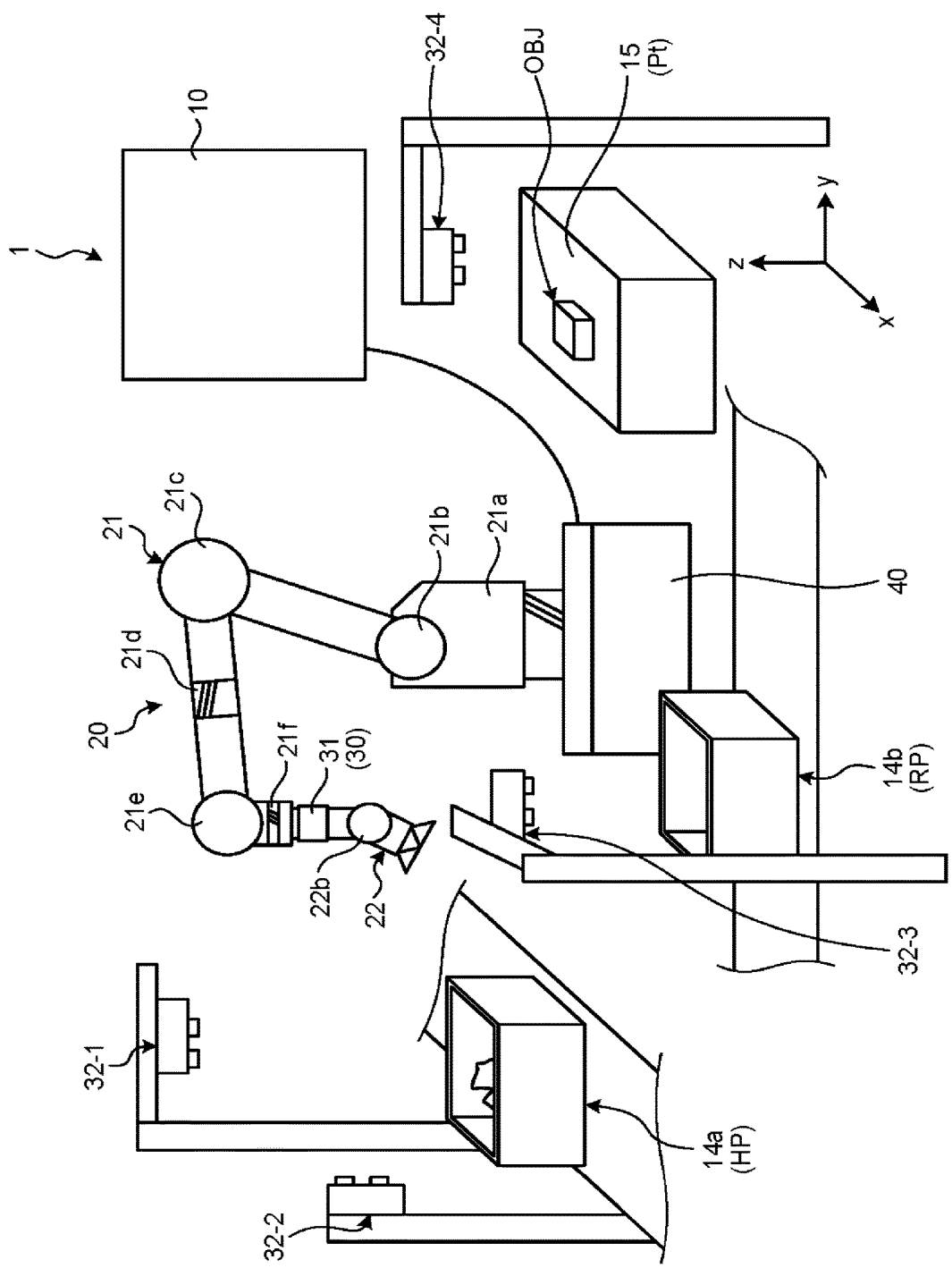
FIG. 1 is a schematic structure of an object handling system.

FIG. 1 is a schematic structure of an object handling system. An object handling system 1 includes a control device 10, a manipulator (robotic arm) 20, a sensor 30, and a housing 40. The object handling system 1 grasps an intended object OBJ at a grasp position HP, and carries and releases it at a release position RP. This motion is referred to as picking or conveyance of the object OBJ.

The manipulator 20 includes an arm 21 and a hand (end effector) 22. The arm 21 represents an articulated robot including rotational parts 21a to 21f to be rotated by a plurality of (e.g., six) servomotors, for example. The manipulator 20 may include a replaceable hand 22. A mechanism such as a tool changer (not illustrated) may be used to replace the hand 22. The arm 21 is not limited to an articulated robot and may be a selective compliance assembly robot arm (SCARA) or a linear motion robot. The arm 21 may be a combination of at least two of an articulated robot, a SCARA robot, and a linear-motion robot.

In the example illustrated in FIG. 1, the hand 22 includes a suction pad 22a serving as a sucking mechanism for grasping the object OBJ, and a pressure sensor (not illustrated). Specifications of the suction pad 22a including number, position, shape, and size can be appropriately changed.

The grasping mechanism for the object OBJ is not limited to a sucking mechanism and the hand 22 may include a jamming mechanism, a clamping mechanism, or a multi-finger mechanism, for example. The hand 22 may include at least two of a sucking mechanism, a jamming mechanism, a clamping mechanism, and a multi-finger mechanism.

The hand 22 includes a flexion 22b. The hand 22 may include a movable element, such as a rotational element and an extendable element, in addition to the flexion 22b.

The hand 22 includes a force sensor 31 as the sensor 30. The position of the force sensor 31 is not limited to the position illustrated in FIG. 1. The hand 22 may include any kind of sensor or sensors other than the force sensor 31.

The sensor 30 is not limited to the force sensor 31 and may be torque sensors, rotation sensors, or current sensors included in the motors of the rotational parts 21a to 21f (FIG. 1). In this case, the control device 10 may derive force acting on the hand 22 from the detected value of the force sensor 31 or calculate it from the current values and/or the rotation values (detected values of the rotation sensors) of the respective motors.

The object handling system 1 includes a plurality of cameras 32-1 to 32-4. The cameras 32-1 to 32-4 represent RGB cameras, range cameras, laser range finders, or laser imaging detection and ranging (LiDAR), for example, and acquire image information and distance information as three-dimensional information.

The object handling system 1 includes the camera 32-1 for grasping, the camera 32-2 for checking a grasping state or for calibration, the camera 32-3 for release, and the camera 32-4 for temporary placement, for example.

The grasping camera 32-1 acquires an image of the object OBJ and detects the object OBJ at and around the grasp position HP where the object OBJ is to be grasped or carried out. In the grasp position HP, the object OBJ is accommodated in a container 14a for grasping, such as a case or a pallet. The grasping camera 32-1 acquires an image of inside the container 14a and detects inside the container 14a, partially or entirely. The grasp position HP may also be referred to as a transfer start position or a departure position of the object OBJ. Although FIG. 1 illustrates that the container 14a is placed on a conveying mechanism such as a belt conveyer, placement of the container 14a is not limited thereto.

The calibration camera 32-2 acquires an image of the object OBJ and detects the object OBJ at a calibration position which is set above the grasp position HP and outside the grasping container 14a.

The release camera 32-3 acquires the image of the object OBJ and detects the object OBJ at and around the release position RP where the object OBJ is released or carried in. In the release position RP, the object OBJ is accommodated in a container 14b for release, such as a case and a pallet. The release camera 32-3 acquires an image of inside the container 14b and detects inside the container 14b partially or entirely to generate sensing data. The release position RP may also be referred to as a transfer end position or an arrival position of the object OBJ. Although FIG. 1 illustrates that the container 14b is placed on a conveying mechanism such as a belt conveyer, placement of the container 14b is not limited thereto.

The temporary-placement camera 32-4 acquires an image of the object OBJ and detects the object OBJ at and around a temporary-placement position Pt where the object OBJ is temporarily placed between the grasp position HP and the release position RP. In the temporary-placement position Pt, the object OBJ is placed on a surface 15 for temporary placement, such ac a table and a stage. The temporary-placement camera 32-4 acquires an image of a part or the whole and detects the part or the whole of the temporary placement surface 15. The temporary-placement position Pt may also be referred to as a halfway position or a going-through position of the object OBJ. The temporary-placement position Pt not necessarily set to a placement surface.

The housing 40 can house various parts, components, and devices of the object handling system 1, such as a power supply unit for driving an electric actuator as a motor, a cylinder, a tank, and a compressor for driving a fluid actuator, and various kinds of safety mechanisms. The control device 10 may be housed in the housing 40.

Control Device

Figure 2:
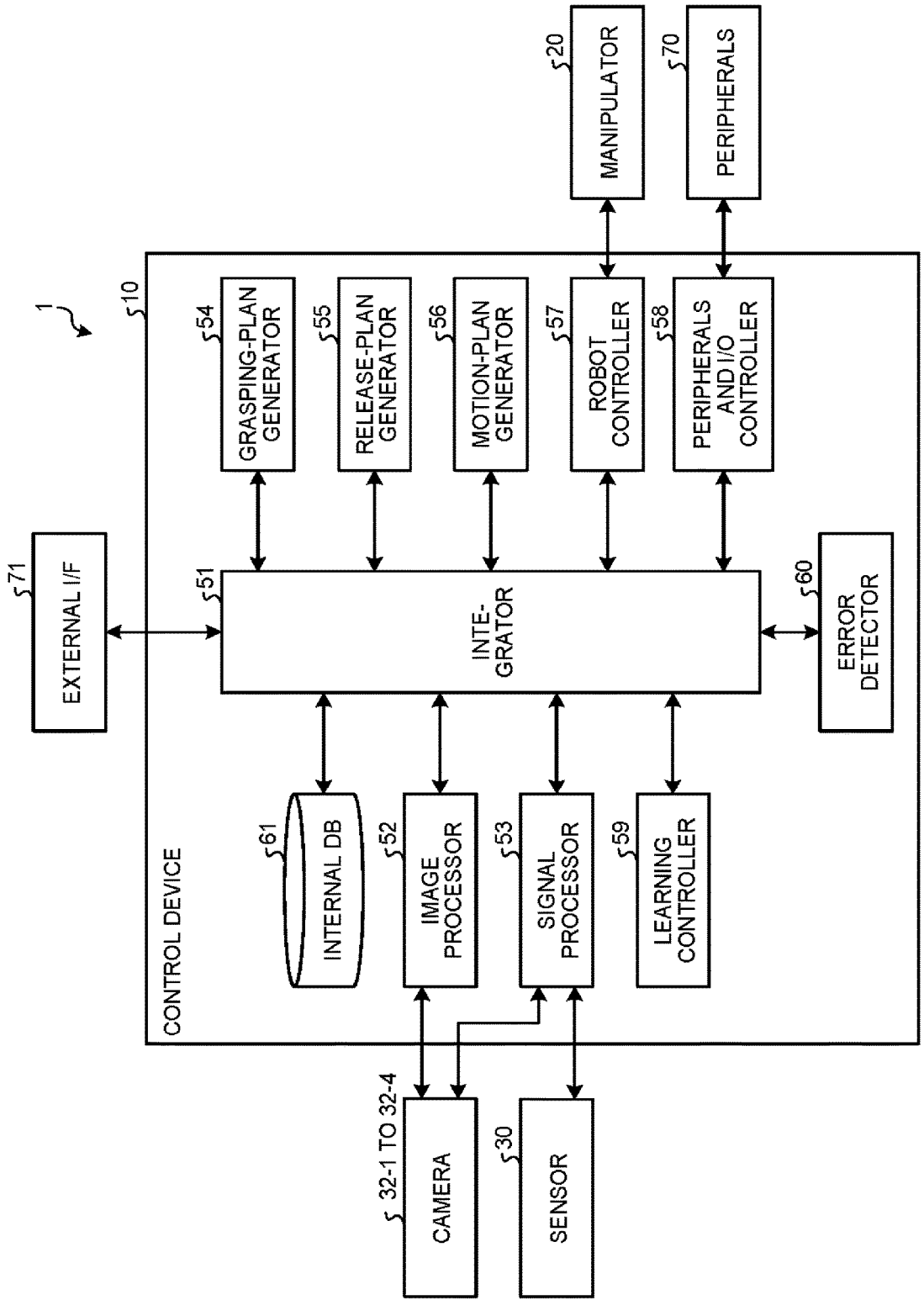
FIG. 2 is a schematic configuration block diagram of control device.

FIG. 2 is a schematic configuration block diagram of the control device. The control device 10 includes an integrator 51, an image processor 52, a signal processor 53, a grasping-plan generator 54, a release-plan generator 55, a motion-plan generator 56, a robot controller 57, peripherals and input/output (I/O) controller 58, a learning controller 59, an error detector 60, and an internal database (DB) 61, for example.

The integrator 51 generates, executes, and manages a motion plan of the object handling system 1 on the basis of user input information from an external interface (I/F) 71, the status of the object handling system 1, and the detected value of the sensor 30.

The image processor 52 processes images and information (detected values) from the cameras 32 to generate necessary information for motion plans, motion control, error detection, and learning, for example.

The signal processor 53 processes information or detected values from the sensor 30 to generate necessary information for motion plans, motion control, and error detection, for example. The signal processor 53 is an exemplary detected-value acquirer.

The grasping-plan generator 54 calculates a grasp method of the object OBJ for the manipulator 20, the grasp position HP and a grasp posture, and a route and via points through which the manipulator 26 is movable to the grasp position HP and the grasp posture without interfering with a surrounding environment. The grasping-plan generator 54 is an exemplary plan generator and an exemplary grasping-posture determiner.

The release-plan generator 55 calculates a method for the manipulator 20 to place (e.g., press), grasp, and lease the object OBJ in a location where the manipulator 20 packs or places the object OBJ in the container 14b, the release position RP and a release posture, and a route and via points through which the manipulator 20 is movable to the release position RP and the release posture without interfering with a surrounding environment. The release-plan generator 55 is an exemplary plan generator.

In accordance with instructions from the integrator 51, the motion-plan generator 56 calculates robot motion information, including a motion method, a motion speed, and a motion path, to allow the manipulator 20 to move from the present position to the grasp position HP, the temporary-placement position Pt, and the release position RP through the path or via points, for example. The motion-plan generator 56 is an exemplary plan generator.

The robot controller 57 controls the object handling system 1 including the manipulator 20 on the basis of the robot motion information generated by the grasping-plan generator 54, the release-plan generator 55, or the motion-plan generator 56 and in response to motion switching instructions from the integrator 51, for example. The robot controller 57 also controls the manipulator 20 on the basis of various kinds of posture information and trajectory plan information from the integrator 51, for example. The robot controller 57 is an exemplary motion controller.

The peripherals and I/O controller 50 performs input/output (I/O) control over various conveying devices, peripherals 75 including a safety door, the sensors to acquire various kinds of information, and lighting control, for example.

The learning controller 59 controls learning functions including robot model learning for improving motional accuracy of the manipulator 20 such as vibration suppression, grasping-control-parameter learning for improving graspablity of the manipulator 20, grasping-database learning, and error-detection learning for improving the performance of the manipulator 20 in carrying out a motion plan. According to the present embodiment, the learning controller 59 selects optimum parameter values under force control, as described later in detail, in accordance with a situation. Such values may be set by a person from his or her empirical values, however, applying the results of machine learning enables power-saving and more efficient processing.

The error detector 60 detects error while monitoring the motion control over the object handling system 1, and the state of the object handling system 1 carrying out the motion plan including grasping and conveying the object OBJ, for example. For error detection, the outputs of the force sensor 31 are converted into values in hand coordinate system and the values are passed through a low-pass filter, for example. The error detector 60 monitors these values to determine an error if the values exceed a certain value. Thereby, the object handling system 1 can interrupt a work in progress and then shift to a recovery motion, for example.

The internal database (DB) 61 includes a robot DB, a hand DB, an article DB, a grasp DB, and an environment DB, which are not illustrated, for example.

The robot DB stores therein the structure and configuration of the object handling system 1, size, weight, and moment of inertia of the respective elements, and motion range, speed, and torque performance of respective drivers, for example.

The hand DB stores therein information on functions and grasping characteristics of the hand 22, for example.

The article DB stores therein information on the object OBJ, including name, identification number, category, image information of the entire surface, CAD model information, weight information, and grasping-characteristics information such as soft, fragile, and shape changeable.

The grasping DB stores therein, for each grasping method of the hand 22, grasp information on the object OBJ, including score information such as graspable position, graspable posture, and graspablity, possible press amount at the time of grasping, threshold for grasping determination, and threshold for error detection. The grasping methods include suction, parallel two-finger, parallel four-finger, and multi-joint, for example.

The environment DB stores therein information on worktables suitable for the object handling system 1 and surrounding environment information representing the motion range of the object handling system 1 and an obstacle O in the periphery, for example.

The external I/F 71 transmits and receives data between the integrator 51 (control device 10) and an external device (not illustrated).

Handling Procedure

Figure 3:
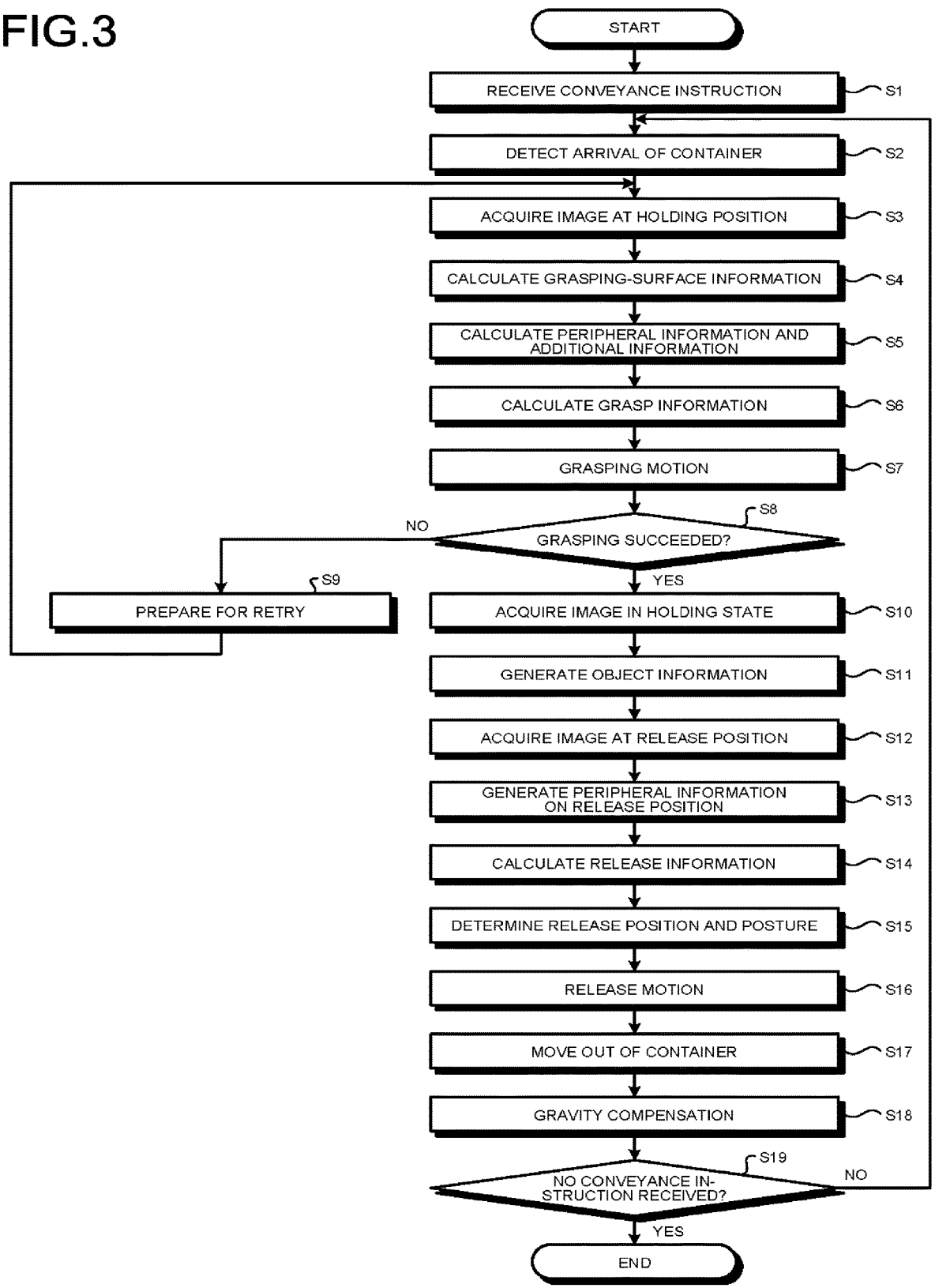
FIG. 3 is a flowchart of a handling process of the control device including grasping, moving, and releasing an intended object.

FIG. 3 is a flowchart of a handling procedure of the control device, including grasping, moving, and releasing an intended object.

The integrator 51 receives a conveyance instruction, i.e., handling instruction for the object OBJ from the external device via the external I/F 71 (Step S1).

The integrator 51 detects the arrival of the object OBJ or the container 14a accommodating the object OBJ at the grasp position HP from an image generated by the camera 32-1 and/or a detected value of another sensor 300 such as a photoelectric sensor or a micro switch (Step S2).

The integrator 51 controls the camera 32-1 to image the object OBJ at and around the grasp position HP such as the inside of the container 14a accommodating the object OBJ (Step S3).

Subsequently, the image processor 52 determines, from the image generated by the camera 32-1, whether the object OBJ is present to identify a graspable surface of the object OBJ, if present. The image processor 52 calculates grasping-surface information including the shape, size, and position and posture of the graspable surface of the object OBJ in a three-dimensional space (Step S4).

The grasping-plan generator 54 calculates peripheral information of the grasp position HP, such as an article a peripheral component other than the object OBJ in the container 14a, from the grasping-surface information. The grasping-plan generator 54 also calculates additional information, such as the moving direction of the hand 22, the magnitude of pressing force, and an allowable moving range under force control, on the basis of the grasping-surface information and the information contained in the article DB (Step S5).

The grasping-plan generator 54 calculates, on the basis of the grasping-surface information, a plurality of items of grasp information for allowing the manipulator 20 to grasp the graspable surface of the object OBJ. According to the calculated grasp information, the grasping-plan generator 54 selects or sets the object OBJ as a grasping object, and the grasp position HP and the grasp posture of the object OBJ. The motion-plan generator 56 generates the robot motion information on the manipulator 20 moving from the present position to the grasp position HP and the grasp posture (Step S6). The grasp information contains the peripheral information and the additional information calculated at Step S5 in addition to grasp-position information and grasp-posture information.

To generate the grasp information and the robot motion information at Step S6, the integrator 51 selects high-speed motion in a region where it is not possible or less probable for the manipulator 20 to interfere or collide with an object other than the object OBJ, for example. Meanwhile, the integrator 51 selects a low-speed motion in a region where it is possible or relatively highly probable for the hand 22 or the object OBJ to interfere or collide with an object other than the object OBJ, as in the situation that the hand 22 approaches or enters the container 14*a*, for example. The motion-plan generator 56 sets a force target value to act on the hand 22 in this region.

Subsequently, the robot controller 57 operates according to the generated robot motion information and controls the manipulator 20 and the hand 22 to grasp the object OBJ at the grasp position HP in the grasp posture. In the periphery of the grasp position HP of the object OBJ, the robot controller 57 controls the hand 22 to perform a pressing motion under the force control alone. For example, the robot controller 57 causes the hand 22 to perform a grasping motion including suction while the suction pad 22*a* is sufficiently in contact with the object OBJ (Step S7).

In the case of the hand 22 hitting an obstacle such as an object other than the object OBJ around the grasp position HP, the robot controller 57 controls the hand 22 to move away from the obstacle according to a given motion method and a force target value, for example. If the grasping surface of the object OBJ is relatively largely tilted, the robot controller 57 controls the hand 22 to be along and in close contact with the grasping surface of the object OBJ according to a given pressing method and a given pressing force.

The integrator 51 or the robot controller 57 monitors the motion and the grasping state of the manipulator 20 and the hand 22 to determines whether the object OBJ is successfully grasped (Step S8).

With a failure in grasping determined at Step S8 (No at Step S8), the integrator 51 allows the manipulator 20 to perform a withdrawing motion and a retry preparation including registration of information representing the grasping failure in the article DB (Step S9). The integrator 51 returns to Step S3 for retrying a grasping motion.

With a success in grasping determined at Step S8 (Yes at Step S8), the robot controller 57 controls the manipulator 20 to move to a position where the state of the hand 22 grasping the object OBJ can be imaged. The integrator 51 controls the camera 32-2 to acquire an image of the hand 22 grasping the object OBJ at the position (Step S10).

The image processor 52 generates object information from the image generated by the camera 32-2 (Step S11). Examples of the object information include, but are not limited to, a position of the object OBJ with respect to the hand 22, a posture of the object OBJ with respect to the hand 22, and the condition and shape of the object OBJ.

Subsequently, the integrator 51 controls the camera 32-3 to acquire the image of the object OBJ at and around the release position RP, such as the inside of the container 14*b* in which the grasped object OBJ is to be released and accommodated (Step S12).

The image processor 52 generate peripheral information from the image generated by the camera 32-3, in cooperation with the integrator 51 (Step S13). Examples of the peripheral information include, but are not limited to, presence or absence of a previously set object other than the object OBJ at and around the release position RP, the size, position, and surface position of the previously set object. The peripheral information on the release position RP is also referred to as obstacle information. The image processor 52 and the integrator 51 serve as a set-object information generator.

Figure 4:
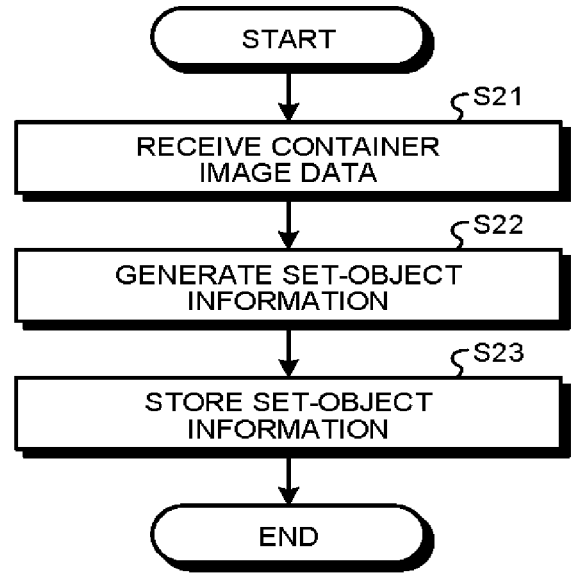
FIG. 4 is a flowchart of processing by a set-object information generator.

FIG. 4 is a flowchart of processing by the set-object information generator. Upon receipt of container image data (stereo image data) of the container 14*b* generated by the camera 32-3 (Step S21), the image processor 52 generates set-object information as history information from the image of the inside of the container 14*b* (Step S22). Examples of the set-object information include, but are not limited to, the placement position, size, and direction of the previously set object (Step S23).

Figure 5:
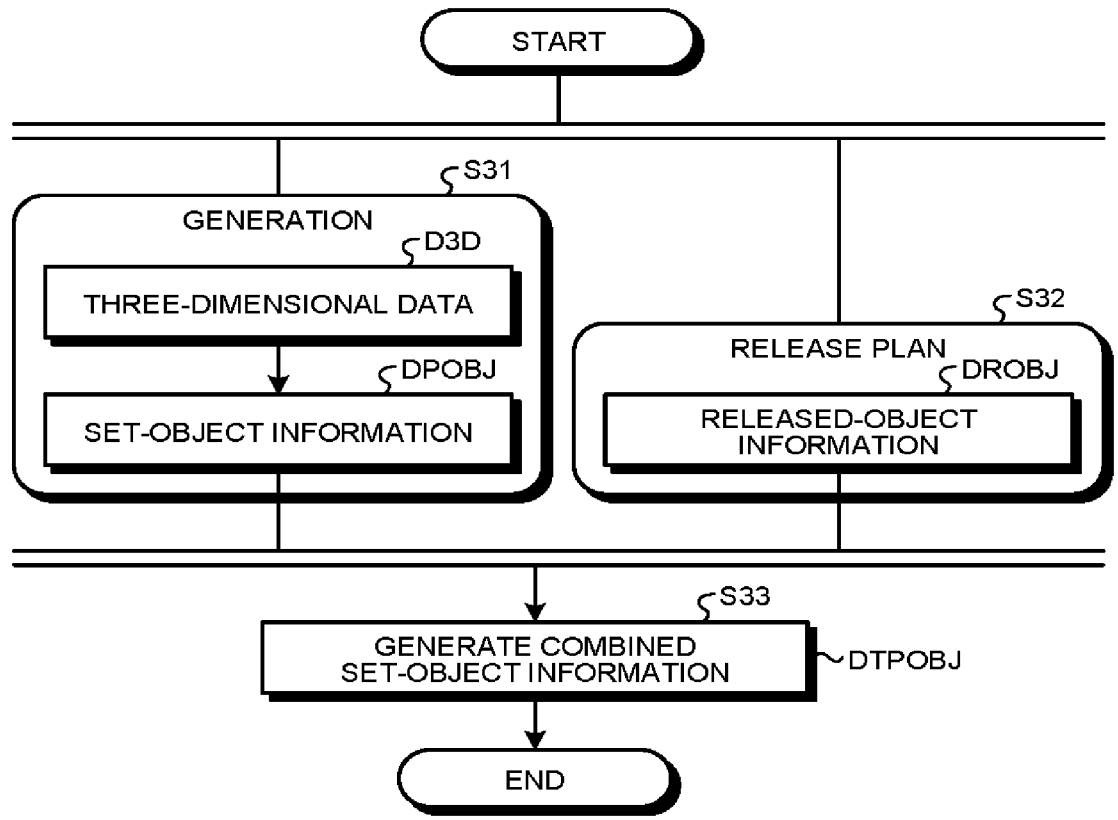
FIG. 5 is a flowchart of generating set-object information.

FIG. 5 is a flowchart of generating the set-object information. The image processor 52 generates three-dimensional data D3D from the container image data being stereo image data, and generates set-object information DPOBJ such as the placement position, size, and direction of the previously set object from the generated three-dimensional data (Step S31).

In parallel with the generation of the set-object information DPOBJ, the integrator 51 acquires released-object information DROBJ (Step S32). Examples of the released-object information DROBJ include, but are not limited to, the type, placement position, and direction of the object OBJ having been released for placement at an intended position according to the release plan generated by the release-plan generator 55, as described later.

Consequently, the integrator 51 combines the set-object information DPOBJ and the released-object information DROBJ of the object OBJ actually released into the container 14*b* through the release operation of the control device 10 (Step S32). The integrator 51 thus generates combined set-object information DTPOBJ (Step S33).

Figure 6A:
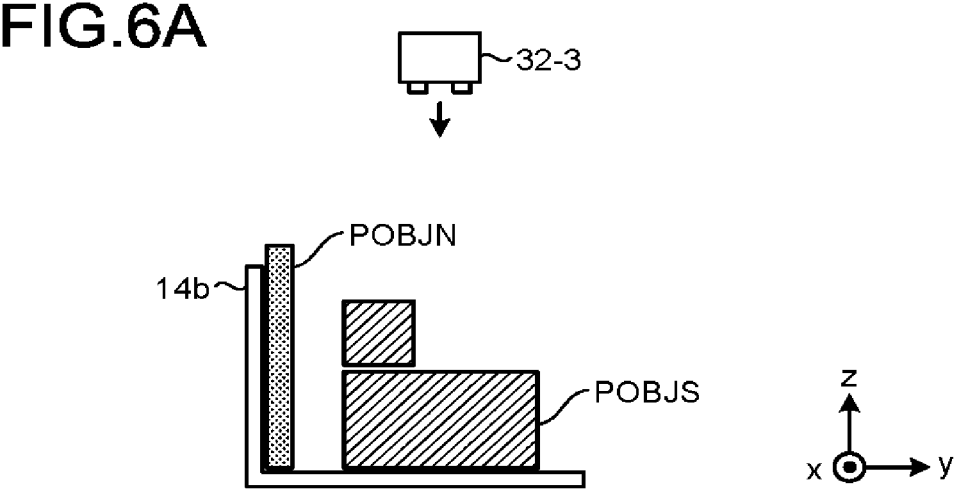
FIGS. 6A and 6B illustrate use of combined set-object information by way of example.
Figure 6B:
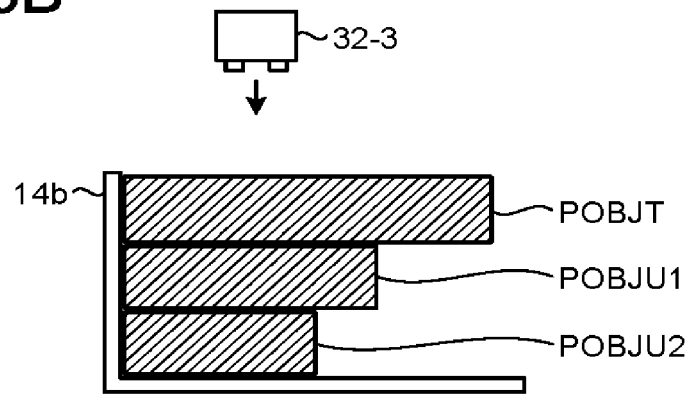

FIGS. 6A and 6B illustrate usage example of the combined set-object information. To generate the combined set-object information DTPOBJ of the set-object information DPOBJ and the released-object information DROBJ, as illustrated in FIG. 6A, the control device 10 can remove, from the set-object information DPOBJ, information on an object POBJN which is present according to the set-object information DPOBJ but is absent according to the released-object information DROBJ. With a difference in size of the previously set object POBJS between the set-object information DPOBJ and the released-object information DROBJ, the control device 10 can update the size contained in the set-object information DPOBJ to the size based or the released-object information DROBJ.

As illustrated in FIG. 6B, in the case of identifying only a previously set object POBJT located closest to the release camera 32-3 from the set-object information DPOBJ, the control device 10 estimates positions of a previously set object POBJU1 and a previously set object POBJU2 below the previously set object POBJT on the basis of the released-object information DROBJ, to be able to determine whether collapse of a load will occur.

Referring back to FIG. 3, the release-plan generator 55 generates release information on the object OBJ grasped by the manipulator 20 on the basis of the object information, the information contained in the grasping DB, and the peripheral information, for example (Step S14). The release information includes release position information, release posture information, via-point position information, and via-point posture information, for example. The release-plan generator 55 calculates additional information such as the pressing direction and magnitude and the allowable moving range of the hand 22 under the force control, for example, and adds the additional information to the release information.

Prior to the generation of the release plan, the release-plan generator 55 performs pre-packing calculation and container-overflow estimation.

Figure 7:
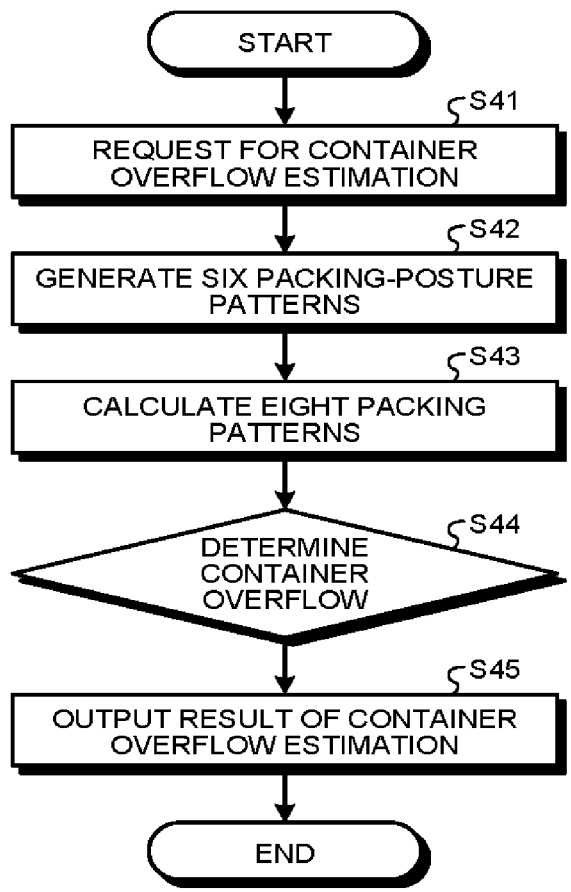
FIG. 7 is a flowchart of a pre-packing calculation process and a container-overflow estimation process.

The following describes a pre-packing calculation process and a container-overflow estimation process. FIG. 7 is a flowchart of pre-packing calculation and container-overflow estimation. The release-plan generator 55 predetermines whether a next object OBJ to grasp, that is, a new object OBJ, is placeable in the container 14*b*, or predetermines whether a container overflow will occur.

For placing one new object OBJ in the container 14*b*, in response to a request for container-overflow estimation (Step S41), the release-plan generator 55 generates six packing-posture patterns of the object OBJ (Step S42).

Figure 8:
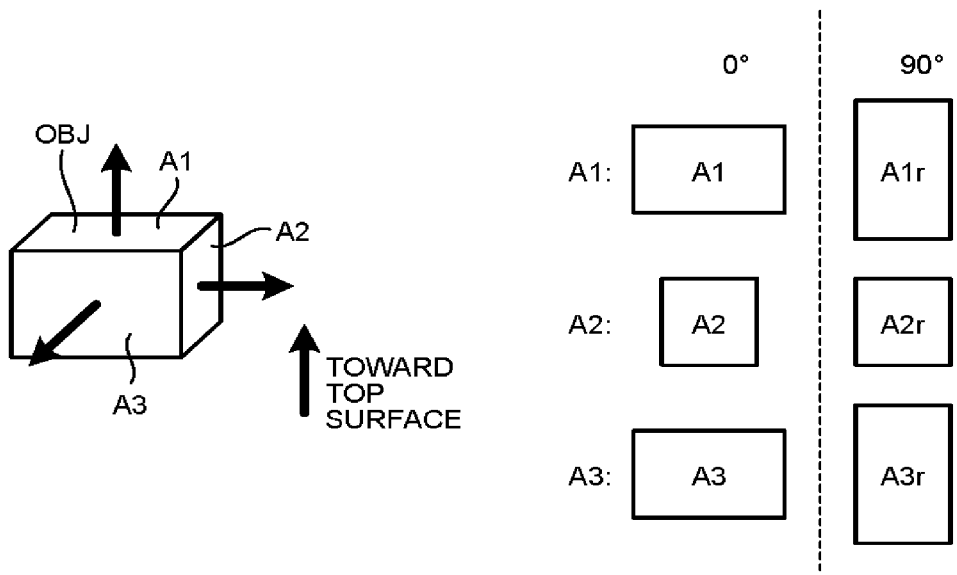
FIG. 8 is an explanatory view of packing-posture patterns of an intended object of a cubic shape.

FIG. 8 is an explanatory view of packing posture patterns of an intended object of a cubic shape. In the present embodiment there are a total of six patterns of the cubic object OBJ with three faces A1, A2, and A3, i.e., three patterns in which any of the faces A1, A2, and A3 faces upward and three patterns in which three faces A1*r*, A2*r*, and A3*r*, corresponding to the faces A1, A2, and A3, rotated by 90 degrees, face upward.

Figure 9:
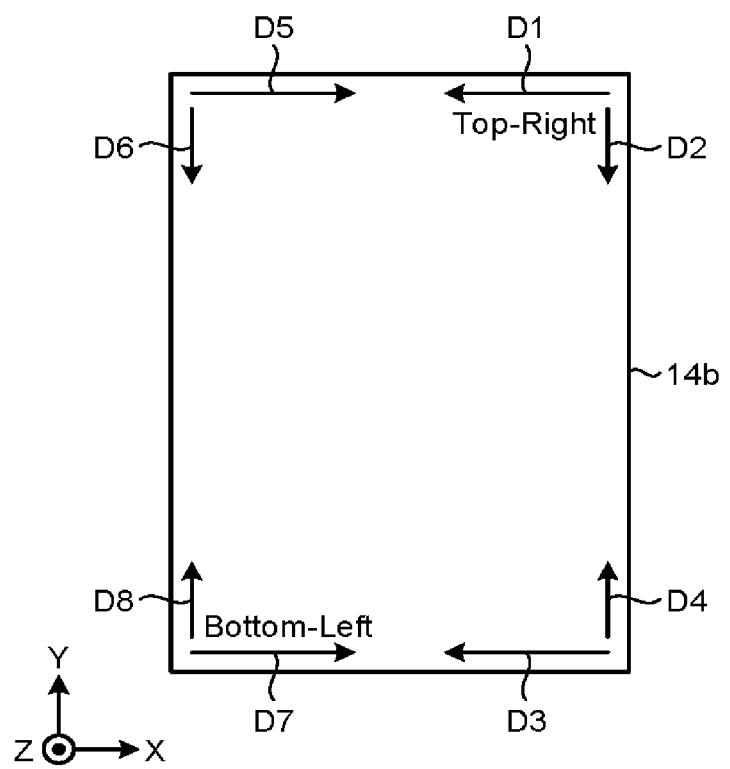
FIG. 9 is an explanatory view of patterns of directions in which the objects are packed into the container.

FIG. 9 is an explanatory view of packing-direction patterns of the objects in the container. As indicated by the arrows D1 to D8 in FIG. 9, in the present embodiment there are eight direction patterns in which the objects OBJ are packed in the container 14*b*, as follows.

D1: starting from the top-right end, packing the objects OBJ leftward in sequence, returning to the right end after packing at the eft end and packing the objects OBJ leftward in sequence, and gradually moving downward;

D2: starting from the top-right end, packing the objects OBJ downward in sequence, returning to the top after packing in the bottom and packing the objects OBJ downward in sequence, and gradually moving leftward;

D3: starting from the bottom-right end, packing the objects OBJ leftward in sequence, returning to the right end after packing at the left end and packing the objects OBJ leftward in sequence, and gradually going toward the top;

D4: starting from the bottom-right end, packing the objects OBJ toward the top in sequence, returning to the bottom after packing in the top and packing the objects OBJ toward the top in sequence, and gradually moving leftward;

D5: starting from the top-left end, packing the objects OBJ rightward in sequence, returning to the left end after packing at the right end and packing the objects OBJ rightward in sequence, and gradually moving downward;

D6: starting from the top-left end, packing the objects OBJ downward in sequence, returning to the top after packing in the bottom and packing the objects OBJ downward in sequence, and gradually moving rightward;

D7: starting from the bottom-left end, packing the objects OBJ rightward in sequence, returning to the left end after packing at the right end and packing the objects OBJ rightward in sequence, and gradually moving toward the top; and D8: starting from the bottom-left end, packing the objects OBJ toward the top in sequence, returning to the bottom after packing in the top and packing the objects OBJ toward the top in sequence, and gradually moving rightward.

As described above, there can be a total of 48 (=6×8) packing patterns by multiplying six direction patterns and eight packing-direction patterns of the object OBJ (Step S43). The release-plan generator 55 determines whether the objects OBJ can be packed in any of the 48 patterns (Step S44). Upon determining that the objects OBJ can be packed in any of the patterns, the release-plan generator 55 determines no occurrence of container overflow and outputs a result of container-overflow estimation indicating OK. Upon determining that packing is unfeasible in any of the patterns, the release-plan generator 55 outputs a result of container-overflow estimation indicating no good (NG) (Step S45).

Figure 10:
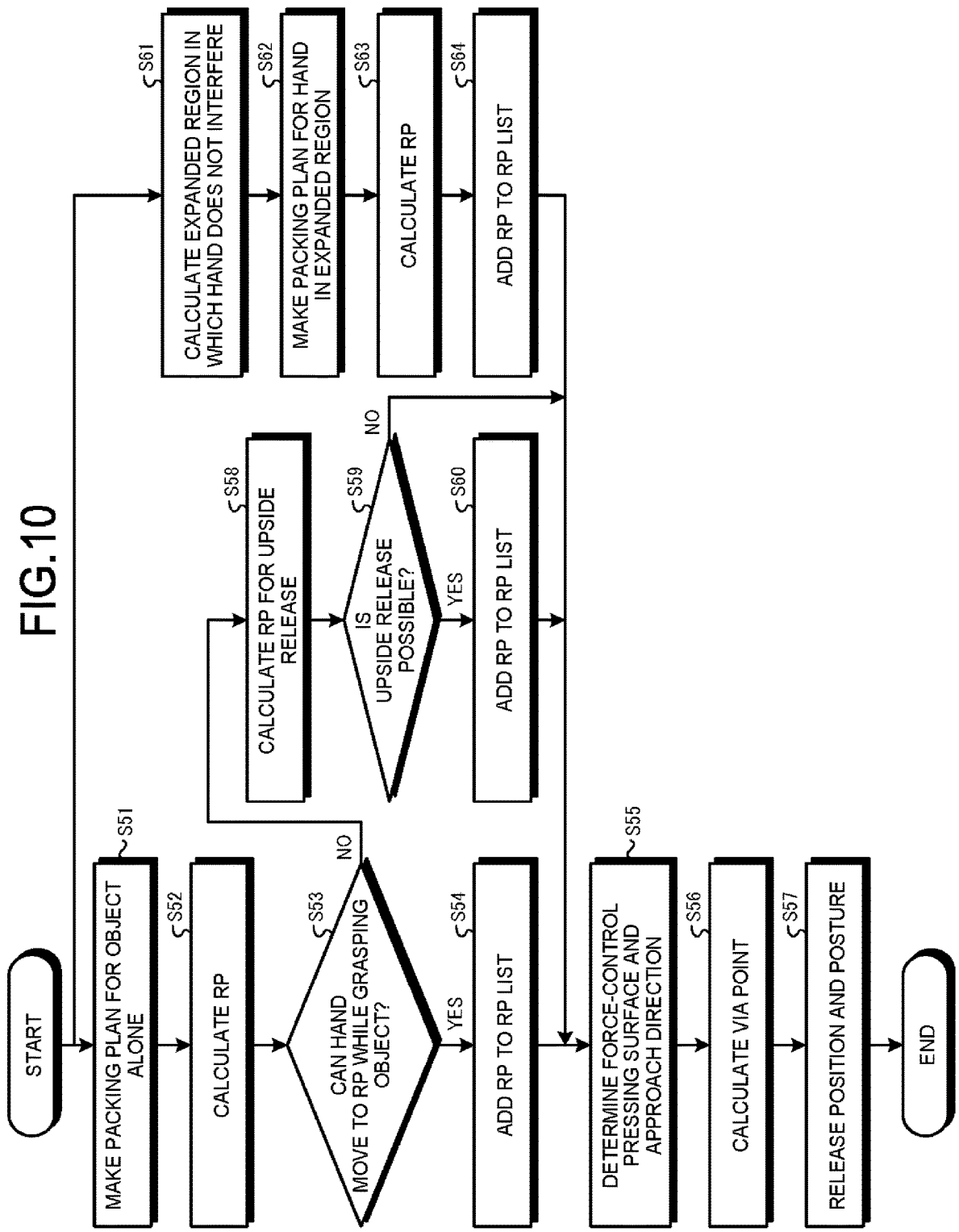
FIG. 10 is a flowchart of processing by a release-plan generator.

The following describes generation of the release information in detail. FIG. 10 is a flowchart of processing by the lease-plan generator. The release-plan generator 55 creates a packing plan for the object OBJ alone to release and place the object OBJ in the container 14*b*, without considering interference of the hand 22 grasping the object OBJ with the surroundings or a peripheral object (Step S51).

Figure 11:
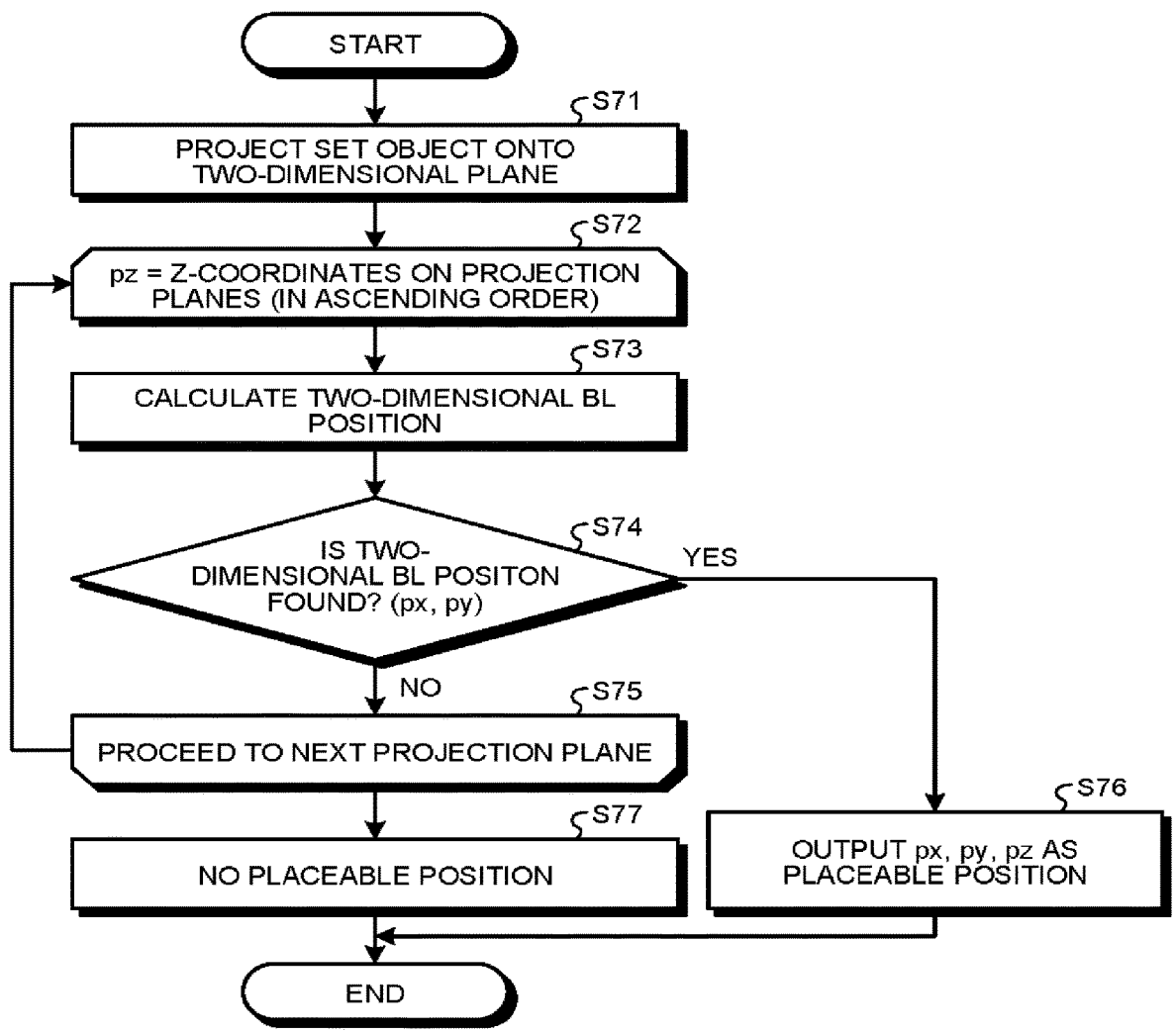
FIG. 11 is a flowchart of a calculation process of a placeable position in a packing plan.

The release-plan generator 55 calculates a release position RP as a placeable position (Step S52). FIG. 11 is a flowchart of calculation of the placeable position in the packing plan. It is assumed that the release-plan generator 55 receive the size of the container 14*b*, the size of the object OBJ to be placed, and the position and size of the previously set object in the container 14*b*.

The release-plan generator 55 projects the previously set object onto a two-dimensional plane (Step S71). The two-dimensional plane refers to one or two or more planes including the inner bottom face of the container 14*b* and the top face of the previously set object.

Figure 12:
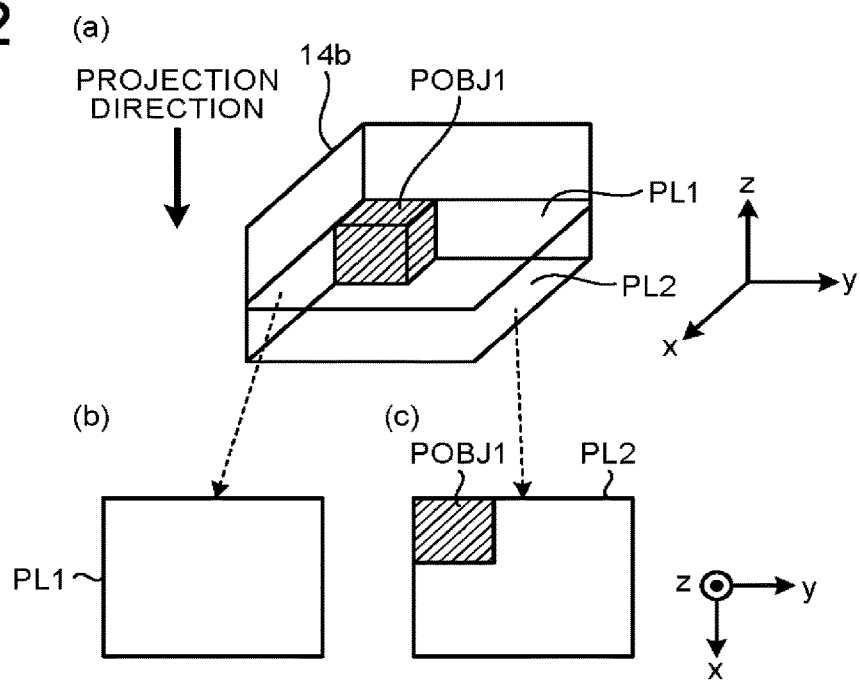
FIG. 12 illustrates one example of a relationship between a previously set object and two-dimensional planes.

FIG. 12 illustrates one example of a relationship between the previously set object and the two-dimensional planes. As illustrated in (a) of FIG. 12, one previously set object POBJ1 is located in a corner of the container 14*b*. In (b) of FIG. 12 a two-dimensional plane PL1 includes the top face of the previously set object POBJ1 and is defined by the shape (rectangular) of the inner bottom face of the container 14*b*. In (c) of FIG. 12 a two-dimensional plane PL2 corresponds to the inner bottom face of the container 14*b*. The previously set object POBJ1 is projected onto the two-dimensional planes PL1 and PL2 from above.

As illustrated in (b) of FIG. 12, the previously set object POBJ1 is not located in the upper part of the two-dimensional plane PL1, therefore, it is not projected onto the two-dimensional plane PL1. Meanwhile, as illustrated in (c) of FIG. 12, the previously set object POBJ1 is located in the upper part of the two-dimensional plane PL2, therefore, it is projected onto the two-dimensional plane PL2.

Figure 13:
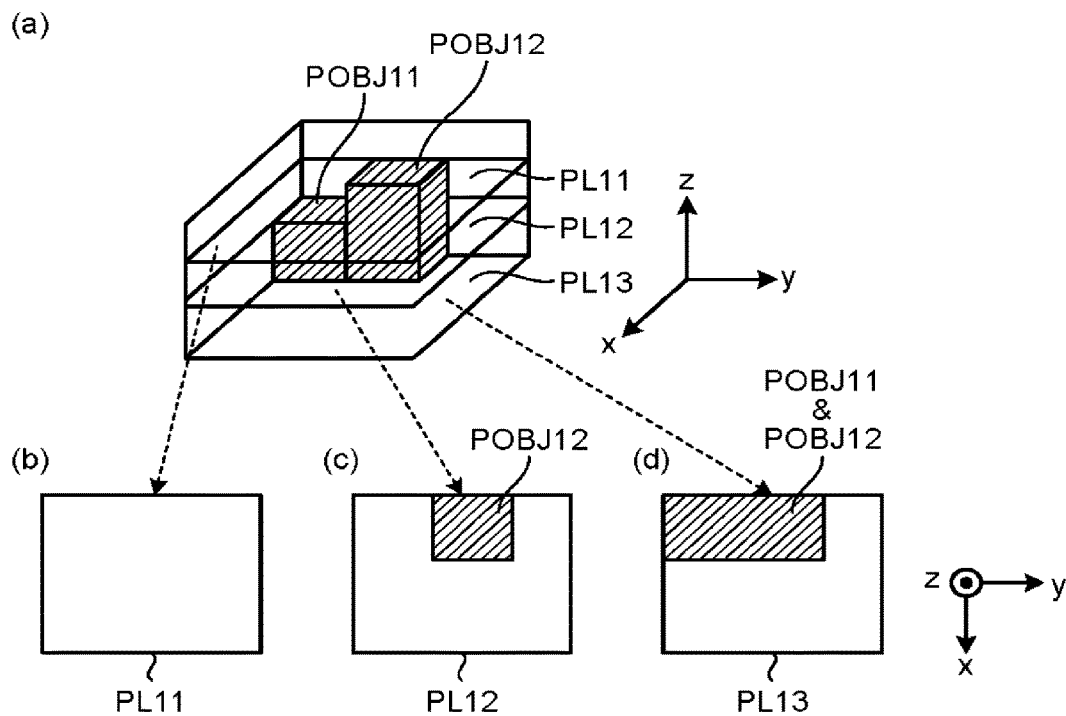
FIG. 13 illustrates another example of a relationship between previously set objects and two-dimensional planes.

FIG. 13 illustrates another example of a relationship between previously set objects and two-dimensional planes. As illustrated in (a) of FIG. 13, two previously set objects POBJ11 and POBJ12 are located in a corner of the container 14*b*. In (b) of FIG. 13 a two-dimensional plane PL11 corresponds to the top face of the previously set object POBJ12 and is defined by the shape (rectangular) of the inner bottom face of the container 14*b*. In (c) of FIG. 13 a two-dimensional plane PL12 corresponds to the top face of the previously set object POBJ11 and is defined by the shape (rectangular) of the inner bottom face of the container 14*b*. In (d) of FIG. 13 a two-dimensional plane PL13 corresponds to the inner bottom face of the container 14*b*.

In this case, as illustrated in (b) of FIG. 13, neither the previously set object POBJ11 nor the previously set object POBJ12 is located in the upper part of the two-dimensional plane PL11, therefore, they are not projected onto the two-dimensional plane PL11.

Meanwhile, as illustrated in (c) of FIG. 13, the previously set object POBJ12 is located in the upper part of the two-dimensional plane PL12, therefore, it is projected onto the two-dimensional plane PL12.

As illustrated in (d) of FIG. 13, the previously set object POBJ11 and the previously set object POBJ12 are located in the upper part of the two-dimensional plane PL13, therefore, they are projected onto the two-dimensional plane PL13.

The calculation of the placeable position in FIG. 11 is now described, referring to the examples (a) to (c) of FIG. 12. Herein, the depth of the container 14*b* (intersecting direction relative to the drawing (a)) is defined as an x-axis. The width of the container 14*b* (horizontal direction in the drawing (a)) is defined as a y-axis. The height of the container 14*b* (vertical direction in the drawing (a)) is defined as a z-axis.

The release-plan generator 55 sets the smallest one of the z-coordinates of the projection planes PL1 and PL2 as a coordinate pz (Step S72). In this case, the z-coordinate of the projection plane PL2 is set. The release-plan generator 55 then calculates a two-dimensional bottom-left (BL) position (Step S73).

Herein, the two-dimensional BL position refers to a "placeable position" disclosed in Kawashima et al., "An Efficient Bottom-left Method for Three-dimensional Packing", Report of Research by Research Institute for Mathematical Sciences, Vol. 1726, 2011, pp. 50-61. The two-dimensional BL position is defined as a position on a certain two-dimensional plane.

The placeable position is defined to be among positions where a cuboid object is placeable on a previously set object without overlapping, and which satisfies at least one of the following three conditions.

(1) Position at a z-coordinate smaller than any other positions (2) Position at the smallest z-coordinate and an x-coordinate smaller than any other positions (3) Position at the smallest z- and x-coordinates and a y-coordinate smaller than any other positions Thus, the two-dimensional BL position represents a placeable position expressed by an x-coordinate and a y-coordinate on the x-y plane perpendicular to the z-axis, for example.

Figure 14:
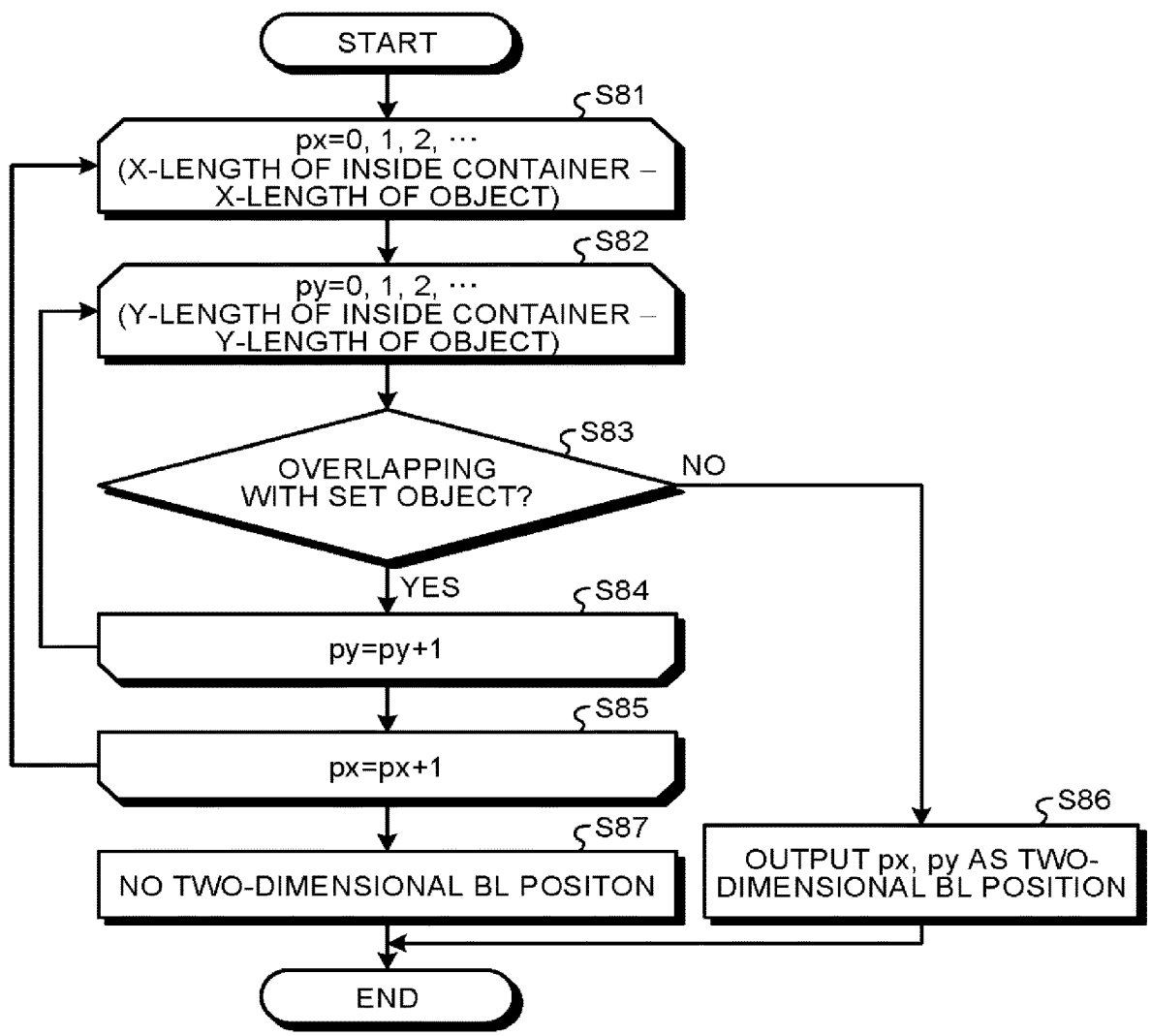
FIG. 14 is an exemplary flowchart of calculation of a two-dimensional bottom-left (BL) position.
Figure 15A:
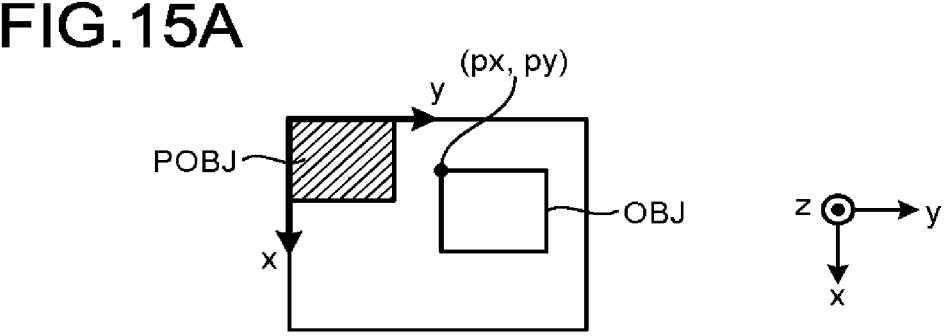
FIGS. 15A, 15B, and 15C illustrate operations for calculating the two-dimensional BL position.
Figure 15B:
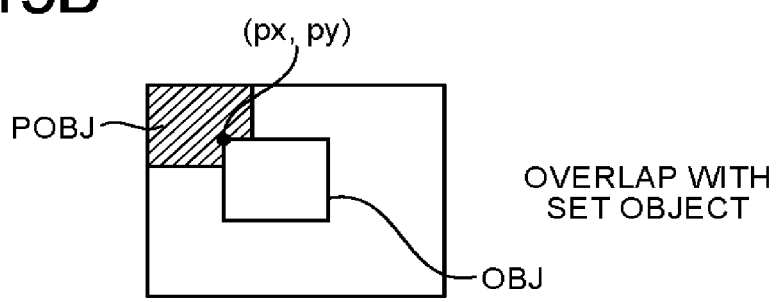
Figure 15C:
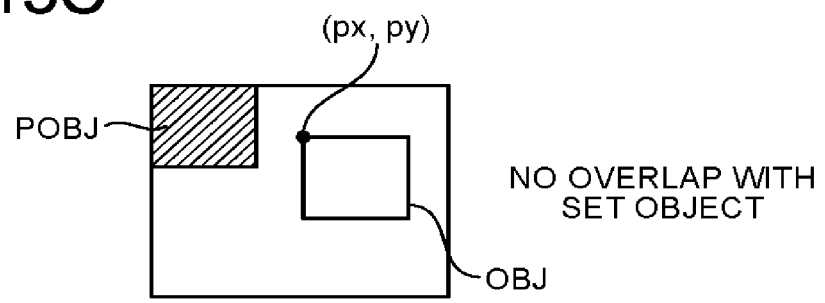

The following describes an exemplary calculation of the two-dimensional BL position. FIG. 14 is a flowchart of an exemplary calculation of the two-dimensional BL position. FIGS. 15A, 15B, and 15C illustrate operation for calculating the two-dimensional BL position. As illustrated in FIG. 15A, the top left coordinates of the rectangular object OBJ in a plan view is defined as (px, py). The initial value of the x-coordinate px is to zero. An increment parameter of the x-axial length is set to one. In response to an instruction to calculate a two-dimensional BL position, the release-plan generator 55 repeats the calculation until the x-coordinate px coincides with a value calculated by: X-axial Length of Container−X-axial Length of Object OBJ (Step S51 to Step S85).

Similarly, the initial value of the y-coordinate py is set to zero. An increment parameter of the y-axial length is set to one. The release-plan generator 55 repeats the calculation until the y-coordinate py coincides with a value calculated by: Y-axial Length of Container−Y-axial Length of Object OBJ (Step S82 to Step S84). After completion of the operation at Step S82, the release-plan generator 55 determines whether the object OBJ in a predetermined placement position overlaps the previously set object POBJ (Step S83).

After determining that the object OBJ in the predetermined placement position overlaps the previously set object POBJ at Step S83 as illustrated in FIG. 15B (Yes at Step S83), the release-plan generator 55 increments the y-coordinate py by 1 (py=py+1) (Step S84). The release-plan generator 55 then returns to Step S82.

After determining that the object OBJ in the predetermined placement position does not overlap the previously set object POBJ at Step S83 (No at Step S83), the release-plan generator 55 outputs the coordinates (px,py) as the two-dimensional BL position (Step S86) and ends the processing.

Meanwhile, if the object OBJ in the predetermined placement position overlaps the previously set object POBJ at all the coordinates (px,py) in the container 14*b* as illustrated in FIG. 15B, the release-plan generator 55 determines that no two-dimensional BL position is found (Step S87) and ends the processing.

Figure 16A:
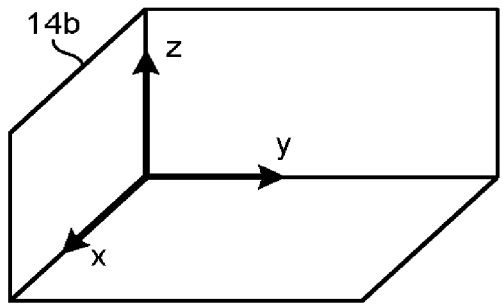
FIGS. 16A, 16B, 16C, and 16D illustrate examples of the placeable position.
Figure 16B:
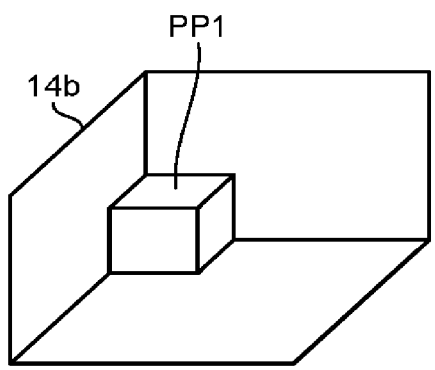
Figure 16C:
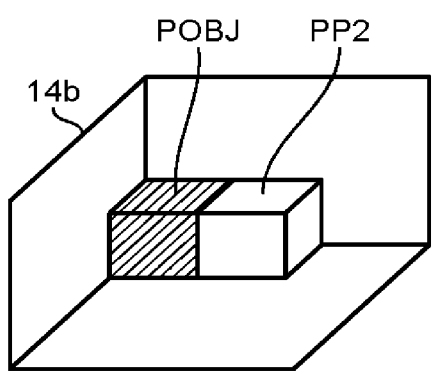

FIGS. 16A, 16B, 16C, and 16D illustrate examples the placeable position. While x-axis, y-axis, and z-axis are defined as illustrated in FIG. 16A, without presence of a previously set object, a position at the smallest x-, y-, and z-coordinates satisfying all the conditions (1) to (3) is set to a placeable position PP1 as illustrated in FIG. 16B. With presence of a previously set object POBJ as illustrated in FIG. 16C, a position at the smallest z- and x-coordinates and a y-coordinate smaller than any other positions which satisfies the condition (3) is set to a placeable position PP2.

Figure 16D:
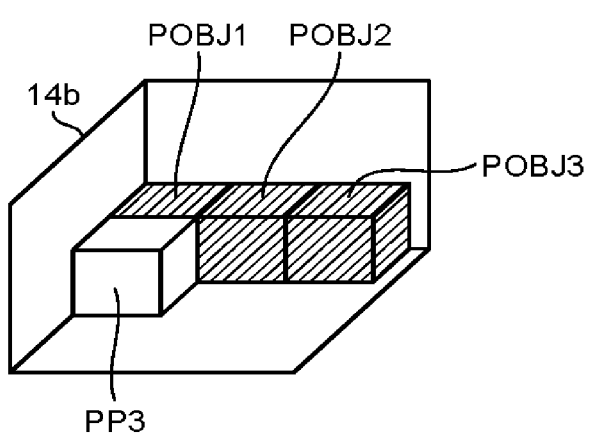

With presence of previously set objects POBJ1 to POBJ3 as illustrated in FIG. 16D, a position at the smallest z- and x-coordinates and the smallest y-coordinate satisfying the condition (3) is set to a placeable position PP3.

Returning back to FIG. 11, the release-plan generator 55 determines whether there is a two-dimensional BL position (px, py) on a plane at the z-coordinate pz (Step S74). After determining that there is a two-dimensional BL position (px, py) at Step S74, the release-plan generator 55 outputs the coordinates (px, py, pz) as the placeable position (Step S76) and ends the processing.

After determining that there is no two-dimensional BL position (px,py) at Step S74, the release-plan generator 55 returns to Step S72. The release-plan generator 55 calculates the two-dimensional BL position, that is, the placeable position on the next projection plane at the second smallest z-coordinate pz (Step S75). With no placeable position found on all the projection planes, the release-plan generator 55 determines that there is no placeable position (Step S77) and ends the processing.

After calculating the release position RP as the placeable position, the release-plan generator 55 determines whether the hand 22, while grasping the object OBJ, is movable to the release position RP Step S53 in FIG. 10).

After determining that the hand 22 is movable to the release position RP while grasping the object OBJ (Yes at Step S53), the release-plan generator 55 adds the release position RP to a release-position list for the object OBJ (Step S54). Subsequently, the release-plan generator 55 sets a force-control pressing surface and an approach direction (Step S55).

The following describes setting of the force-control pressing surface. The release-plan generator 55 of the control device 10 performs, when finding the wall (including the inner bottom face) of the container 14*b* or a previously set object around the release position, force control over a new object OBJ to press the wall of the container 14*b* or the previously set object for placement.

Figure 17A:
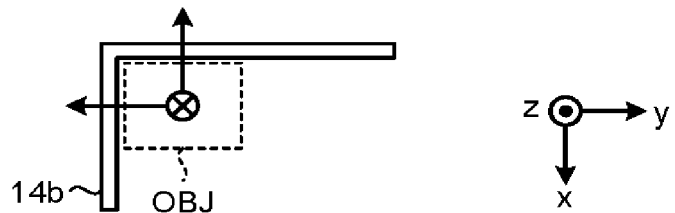
FIGS. 17A, 17B, 17C, and 17D illustrate examples of pressing control under force control.

FIGS. 17A, 17B, 17C, and 17D illustrate exemplary pressing control under the force control. In FIG. 17A, the inner bottom face of the container 14*b* is located below the bottom surface of the new object OBJ, and the walls of the container 14*b* are located in the x-direction and the y-direction of the object OBJ. In this case, the control device 10 performs a force control over the hand 22 to press the object OBJ in all of the x-direction, the y-direction, and the z-direction.

Figure 17B:
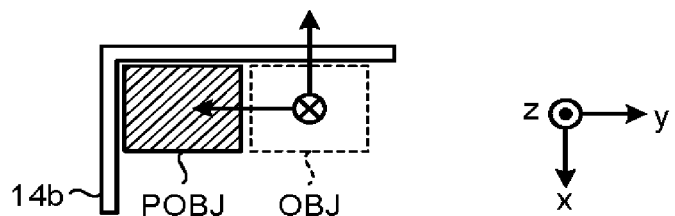

In FIG. 17B, the inner bottom face of the container 14*b* is located below the bottom surface of the new object OBJ, the previously set object POBJ is located in the y-direction of the object OBJ, and the wall of the container 14*b* is located in the x-direction of the object OBJ. In this case, the control device 10 performs a force control over the hand 22 to press the object OBJ in all of the x-direction, the y-direction, and the z-direction.

Figure 17C:
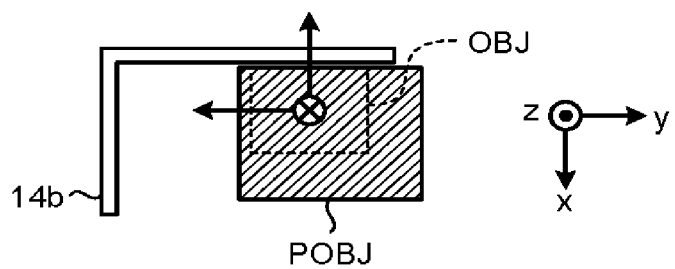

In FIG. 17C, the previously set object POBJ is located below the new object OBJ, the wall of the container 14b is located in the x-direction of the object OBJ, and neither the wall of the container 14b nor the previously set object POBJ is located in the y-direction of the object OBJ. In this case, the control device 10 performs a force control over the hand 22 to press the object OBJ in the x-direction and the z-direction.

Figure 17D:
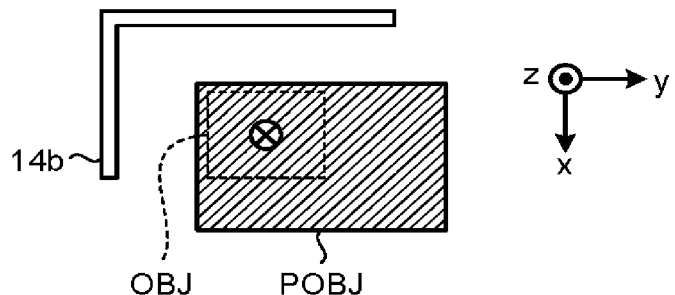

In FIG. 17D, the previously set object POBJ is located below the new object OBJ, and neither the wall of the container 14b nor the previously set object POBJ is located in the x-direction and the y-direction of the object OBJ. In this case, the control device 10 performs a force control over the hand 22 to press the object OBJ in the z-direction alone.

Figure 18A:
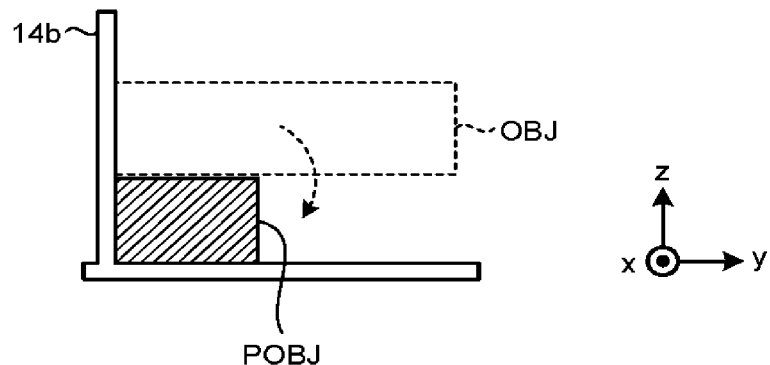
FIGS. 18A and 18B illustrate examples that pressing control is unfeasible.
Figure 18B:
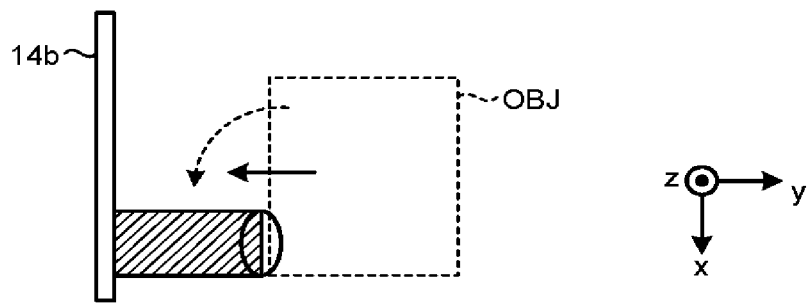

FIGS. 18A and 18B illustrate examples that the pressing control is unfeasible. In the pressing control under the force control, in the case that the previously set object POBJ is smaller in size than the new object OBJ as illustrated in FIG. 18A or that the pressed surface of the previously set object POBJ is smaller in area than the new object OBJ as illustrated in FIG. 19B, the objects may collapse, or the new object OBJ may fall onto the previously set object POBJ. In such cases, however, the control device 10 will determine in another operation, as described later, that the new object OBJ is not placeable, so that no troubles will occur.

Figure 19:
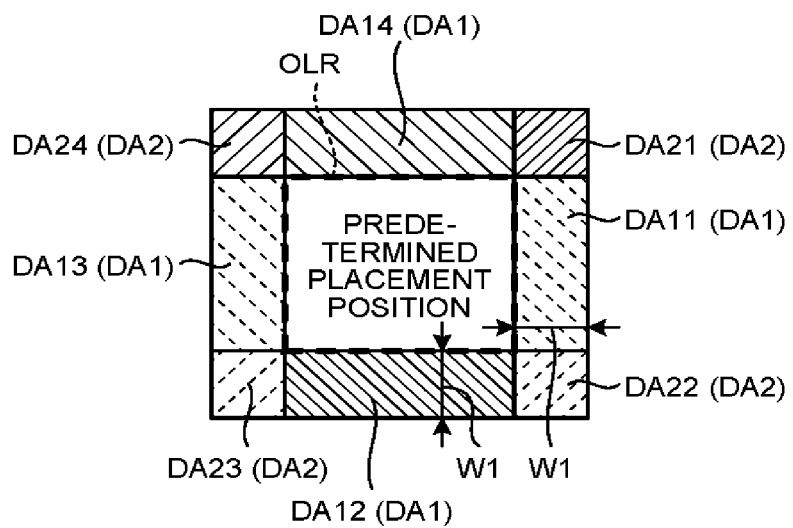
FIG. 19 is an explanatory view for setting a determination region in approach-direction calculation.

The following describes calculation of the force-control pressing surface and the approach direction of the new object OBJ to the placement position. FIG. 19 illustrates setting a determination region in the calculation process of the approach direction.

The control device 10 sets a first determination region DA1 (DA11 to DA14) of a given width W1 and a second determination region DA2 (DA21 to DA24) of the width W1 around a predetermined placement position OLR of the new object OBJ. The first determination region DA1 is set in parallel with the side faces of the object OBJ. The second determination region DA2 is set in the diagonal directions of the object OBJ. The given width W1 is set as a distance by which the object OBJ, when placed, is not generally away from the adjacent wall of the container 14b or the previously set object. In other words, the width W1 is set to a distance in which detection of the wall of the container 14b or the previously set object can be ensured.

Figure 20A:
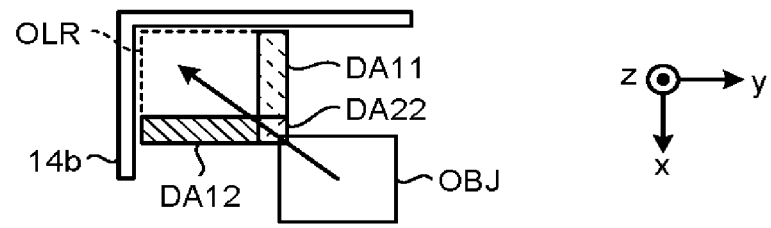
FIGS. 20A, 20B, and 20C illustrate the approach-direction calculation.
Figure 20B:
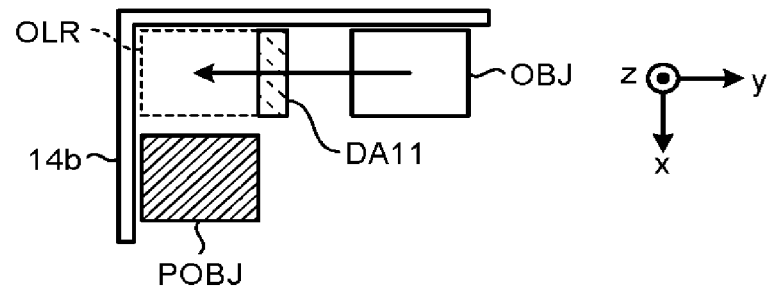
Figure 20C:
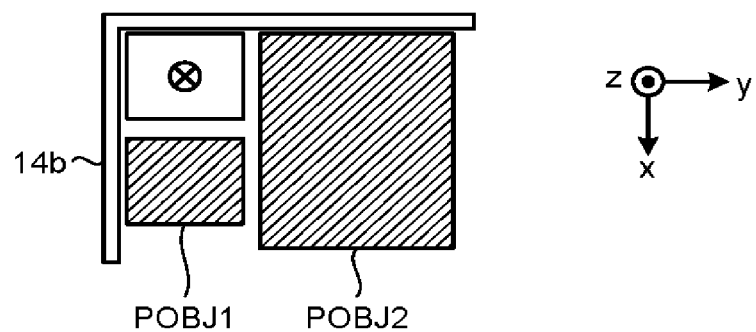

FIGS. 20A, 20B, and 20C illustrate the approach-direction calculation. As illustrated in FIG. 20A, without the wall of the container 14b or the previously set object being an obstacle in the second determination region DA22 being the second determination region DA2 and the first determination regions DA11 and DA12 being the first determination region DA1 adjacent to the second determination region DA22, the control device 10 determines that the object OBJ can obliquely approach the predetermined placement position OLR as indicated by the arrow in FIG. 20A.

Upon determining that the object OBJ cannot obliquely approach, and neither the wall of the container 14b nor the previously set object being an obstacle is located in the first determination region DA11 of the first determination region DA1 as illustrated in FIG. 20B, the control device 10 determines that the object OBJ can laterally approach the predetermined placement position OLR as indicated by the arrow in FIG. 20B.

Upon determining that the object OBJ cannot obliquely or laterally approach, and the walls of the container 14b and the previously set objects being as obstacles are located in the entire first determination region DA1 as illustrated in FIG. 20C, the control device 10 determines that the object OBJ can approach from directly above.

In the approach-direction calculation, the priority of the approach direction is set such that the oblique approach is highest, the lateral approach is second highest, and the overhead approach is lowest.

Figure 21:
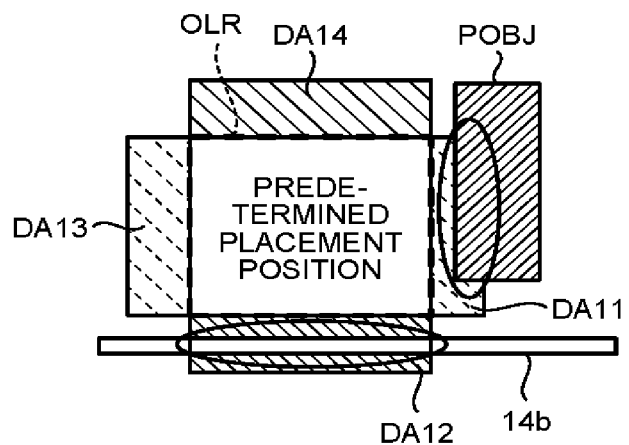
FIG. 21 illustrates one example of determining a pressing surface.

The following describes an example of determination on a pressing receivable surface. FIG. 21 illustrates an example of determination on a pressing receivable surface. As illustrated in FIG. 21, the control device 10 searches for the wall surface of the container 14b or the surface of the previously set object POBJ located in the first determination region DA1 (DA11 to DA14) illustrated in FIG. 19. Another determination region different in width from the first determination region DA1 may be used for the search. The control device 10 sets a pressing center TCP on a line extending vertically from the release position RP and whose vertical position coincides with the vertical position of the center of the new object OBJ.

FIGS. 22A, 22B, 22C, and 22D illustrate another example of determination on the pressing receivable surface. The control device 10 determines whether the wall surface of the container 14b or the surface of the previously set object POBJ is located on both sides of the pressing center TCP in the horizontal direction (lateral direction in FIGS. 22A to 22D) along the pressing plane. After determining that the wall surface of the container 14b or the surface of the previously set object POBJ is present on both horizontal sides along the pressing plane, the control device 10 determines that there is a pressing receivable surface, or that pressing is possible.

Figure 22A:
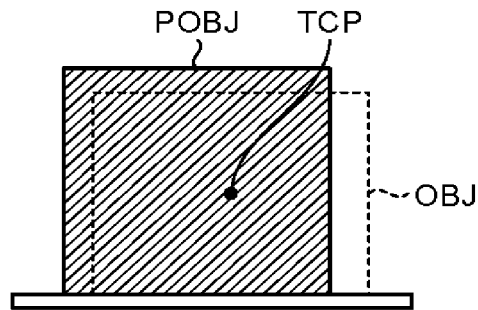
FIGS. 22A, 22B, 22C, and 22D illustrate another example of determining a pressing surface.

Specifically, as illustrated in FIG. 22A, if the surface of the previously set object POBJ is found on both horizontal sides of the pressing center TCP along the pressing plane, the control device 10 determines that there is a pressing receivable surface, or that pressing is possible.

Figure 22B:
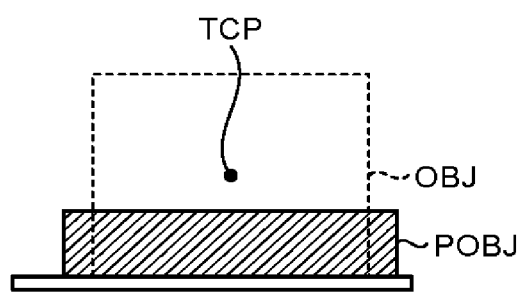

In the example illustrated in FIG. 22B, the surface of the previously set object POBJ is located on both horizontal sides of the pressing center TCP along the pressing plane, therefore, the control device 10 determines that there is a pressing receivable surface, or that pressing is possible.

Figure 22C:
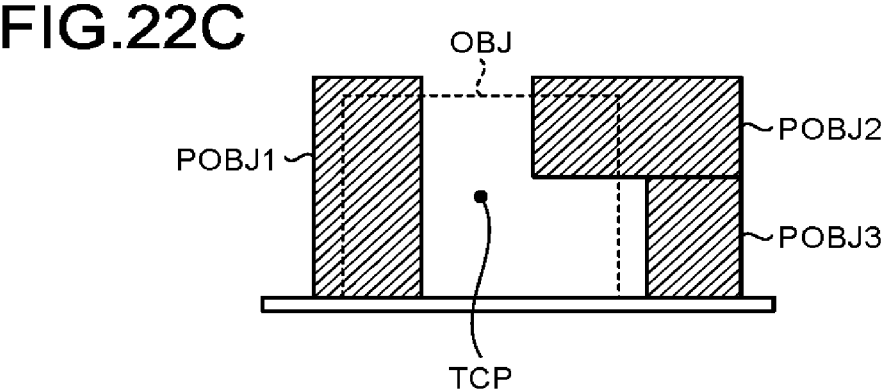
Figure 22D:
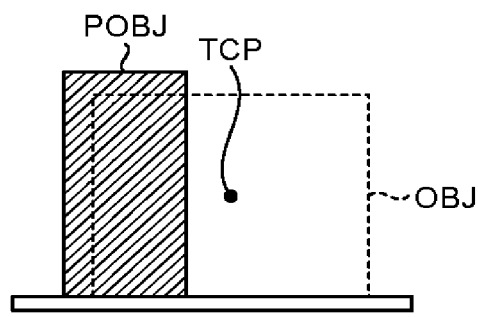

In the example illustrated in FIG. 22C, the surface of the previously set object POBJ1 is located on one horizontal side of the pressing center TCP along the pressing plane, and the surface of the previously set object POBJ2 is located on the other horizontal side. Consequently, the control device 10 also determines that there is a pressing receivable surface, or that pressing is possible.

Meanwhile, in the example illustrated in FIG. 22B, the surface of the previously set object POBJ is located on one horizontal side along the pressing plane, but neither the wall surface of the container 14b nor the surface of the previously set object POBJ is located on the other horizontal side along the pressing plane. Consequently, the control device 10 determines that there is no pressing receivable surface, or that pressing is impossible.

The following describes a method of determining a pressing direction and an approach direction. FIG. 23 is a table for determining the pressing direction and the approach direction.

The determination on the pressing direction is now described. Upon determining that oblique approach is possible and that the pressing receivable surface is found on two surfaces of an approached object through the above processing, the control device 10 sets the pressing direction to an oblique direction.

Upon determining that lateral approach is possible and that the pressing receivable surface is found on one surface of the approached object through the above processing, the control device 10 sets the pressing direction to a lateral direction. Upon determining that approach is possible and that no pressing receivable surface of the approached object is found through the above processing, the control device 10 sets the pressing direction to an overhead direction.

The determination on the approach direction is described next. After setting the pressing direction to an oblique direction as described above, the control device 10 determines the approach direction to be oblique. After determining the pressing direction to be a lateral direction as described above, the control device 10 determines the approach direction to be oblique or lateral.

After determining the pressing direction to be an overhead direction described above, the control device 10 determines the approach direction to be any of oblique, lateral, and overhead. That is, there are six combinations of the pressing directions and the approach directions, as illustrated in FIG. 23.

The above-described method determining the pressing direction and the approach direction is applied when them is no previously set object higher in height than the new object OBJ, which would affect the approach of the object OBJ, in the vicinity of the predetermined placement position OLR. The following method will be applied if there is a previously set object higher in height than the new object OBJ, which would affect the approach, in the vicinity of the predetermined placement position.

FIG. 24 is another table for determining the pressing direction and the approach direction. Differences from FIG. 23 will be described below. FIG. 24 is different from FIG. 23 in that the control device 10 determines the pressing direction to be overhead or lateral, upon determining that the lateral approach is possible and that the pressing receivable surface is found on one surface of the approached object through the above processing.

In this case, the pressing direction may be set to a lateral direction and the approach direction may be set to an overhead direction, although in the above example the approach direction and the pressing direction are both set to a lateral direction.

Referring back to FIG. 10, after the force-control pressing surface and the approach direction are set, the release-plan generator 55 calculates the via points of the hand 22 till the release position RP (Step S56). Subsequently, the release-plan generator 55 sets the actual release position RP and the posture of the hand 22 at the release position RP, referring to the release-position list and ends the processing (Step S57).

Upon determining that the hand 22 is not movable to the release position RP while grasping the object OBJ (No at Step S53), the release-plan generator 55 calculates a release position RP for upside release (Step S58).

Figure 25:
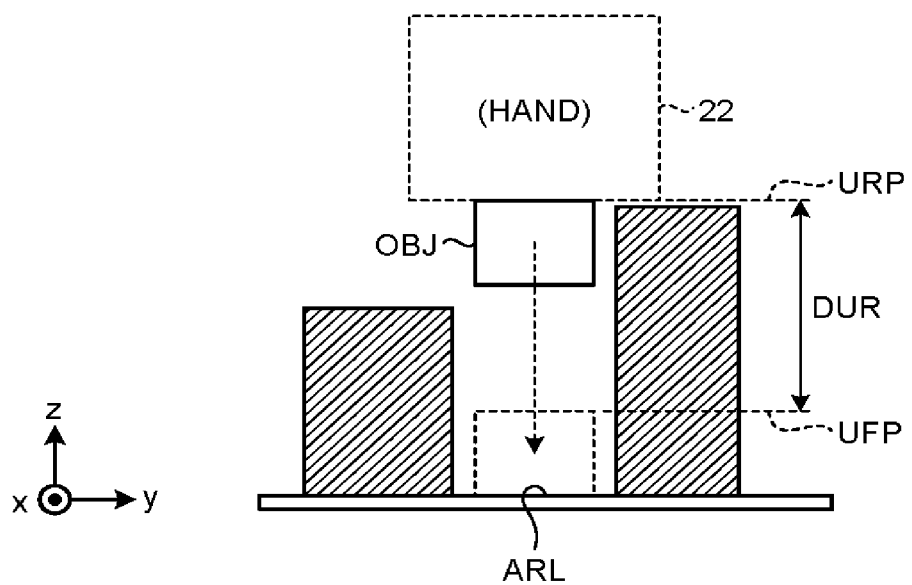
FIG. 25 illustrates an example that the objects released above a release position.

Specifically, in grasping and conveying a new object with the hand 22 to the release position, the hand 22 may be able to place the object OBJ in the container 14b by releasing the object OBJ from above the release positron, irrespective of interference with the previously set object POBJ or the wall of the container 14b. FIG. 25 illustrates the release of the object from above the release position. In FIG. 25, a new object OBJ is to be released at a release position ARL, and the bottom surface of the hand 22 reaches a release position URP above the release position ARL to release the object. In such a case, the control device 10 controls the hand 22 to perform an upside release when an upside release distance DUR, being the difference between the upside release position URP and a top-face position UFP of the object OBJ placed at the release position ARL, is equal to or smaller than a certain set value.

Furthermore, the release-plan generator 55 determines whether to perform an upside release, considering the physical stability of the object OBJ.

Figure 26:
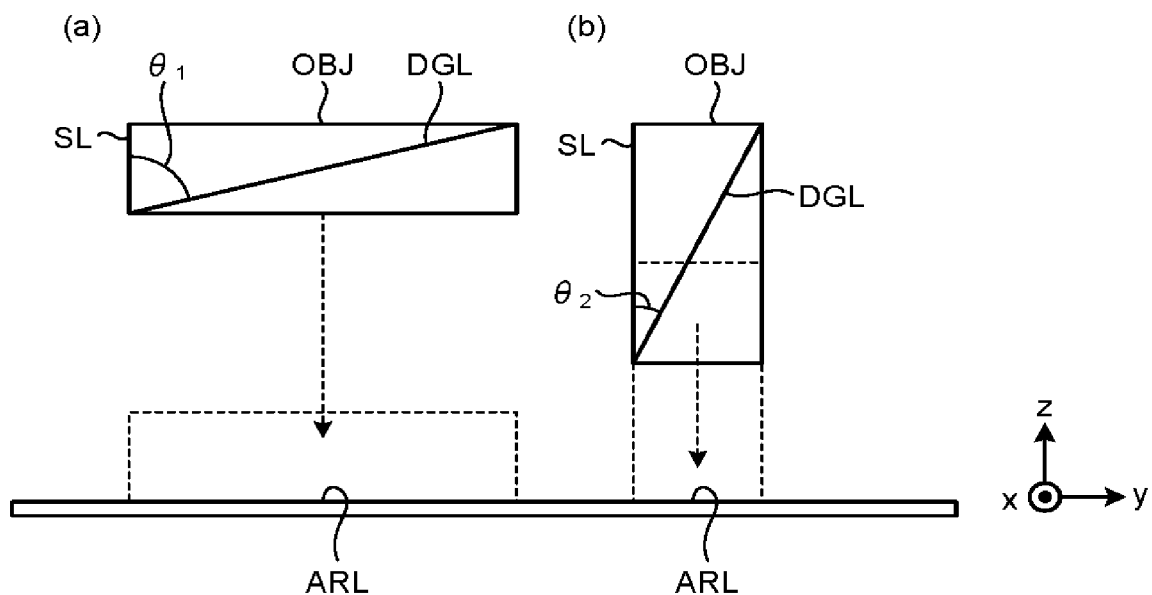
FIG. 26 is an explanatory view of a basis for considering the physical stability of the object.

FIG. 26 illustrates a basis for determining the physical stability of the object. As illustrated in (a) and (b) of FIG. 26, the intended object OBJ is a cuboid and is to be placed at the release position ARL. In such a case the release-plan generator 55 determines the physical stability thereof on the basis of whether an angle $\theta$ ($\theta_1$ and $\theta_2$) between a diagonal line DGL and a vertical (parallel to the z-axis) side of the side surface of the object OBJ is larger than a certain reference angle $\theta_{ref}$.

Specifically, with the angle $\theta_1$ between the diagonal line DGL and the vertical side exceeding the certain reference angle $\theta_{ref}$ as illustrated in (a) of FIG. 26, the object OBJ is placed in a horizontally long posture. Thus, the object OBJ is considered to be physically stable with no possibility of falling down when released from above. Thus, the object OBJ can be a subject of upside release.

By contrast, with the angle $\theta_2$ between the diagonal line DGL and the vertical side being equal to or smaller than the certain reference angle $\theta_{ref}$ as illustrated in FIG. 26B, the object OBJ is placed in a vertically long posture. Thus, the object OBJ is considered to be physically unstable with possibility of falling down when released from above. Consequently, the object OBJ cannot be a subject of upside release.

Referring back to FIG. 10, the release-plan generator 55 determines whether to be able to perform an upside release by determining whether the upside release distance DUR, being the difference between the upside release position URP and the top-face position UFP of the object placed at the release position ARL, is equal to or smaller than the certain set value (Step S59).

Upon determining that an upside release is unfeasible at Step S59 (No at Step S59), the release-plan generator proceeds to Step S55. Upon determining that an upside release is feasible at Step S59 (Yes at Step S59), the release-plan generator 55 adds the release position RP as the upside release position to the release-position list for the object OBJ (Step S60).

The release-plan generator 55 proceed to Step S55 to perform the subsequent processing, as described above (Steps S55 to S57).

There may be a situation that the object is placeable in the container, however, the hand 22 conveying the object may interfere with other objects, e.g., the wall of the container and/or the previously set object, and may be unable to move to a desired release position. To address this, in the present embodiment the release-plan generator 55 calculates the release position RP in such a manner as to prevent the hand 22 from interfering with other objects, in parallel with the processing at Steps S51 to S60. Specifically, the release-plan generator 55 calculates an expanded region in which the hand 22 does not interfere with other objects (Step S61). The release-plan generator 55 creates a packing plan for the hand 22 in the expanded region (Step S62). Then, the release-plan generator 55 calculates a release position RP (Step S63) and adds the release position RP to the release-position list (Step S64).

FIG. 27 illustrates an example that the hand 22 is driven but fails to reach the release position. The object POBJ is previously set in the container 14b, and the new object OBJ is to be placed adjacent to the previously set object POBJ. The hand 22 is lowered to place the new object. OBJ in the release position set on the bottom face of the container 14b as illustrated in (a) of FIG. 27, and the hand 22 comes into contact with the top face of the previously set object POBJ as illustrated in FIG. 27(b). Thus, the hand 22 grasping the new object OBJ cannot reach the release position.

Figure 28:
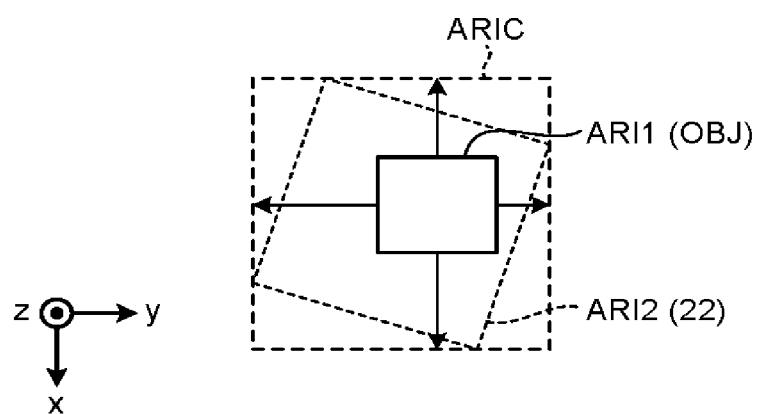
FIG. 28 is an explanatory view of an expanded interference region.

FIG. 28 illustrates an expanded interference region. As illustrated in FIG. 28, the release-plan generator 55 sets an expanded interference region ARIC having a rectangular shape. The expanded interference region ARIC is set by: deriving a shape corresponding to a logical disjunction of an interference region ARI2 of the hand 22 viewed from above (in the z-axis direction) and an interference region ARI1 of the new object OBJ viewed from above; and making the sides of the derived shape parallel to the respective sides of the interference region ARI1 of the new object OBJ, i.e., placing the object in a desired direction.

In the case of a new object OBJ of a shape other than a rectangle in a plan view, the interference region ARI1 of the new object is set to a rectangular region circumscribing the shape of the new object OBJ.

In the case of a circular new object in a plan view, for example, the interference region ARI1 is set to a quadrangular region circumscribing the circle. In the case of an ellipse new object in a plan view, the interference region ARI1 is set to a rectangular region with the long sides having the same length as that of the major axis of the ellipse and the short sides having the same length as that of the minor axis of the ellipse.

As described above, by setting the expanded interference region ARIC on the basis of the logical disjunction of the interference region ARI1 and the interference region ARI2, the object handling system 1 can ensure the conveyance of a new object to the release position with no interference between both the hand 22 and the new object and other objects.

FIG. 29 illustrates an example that the hand 22 is driven and can reach the release position ARL. Specifically, the hand 22 is lowered to move the new object OBJ to the release position ARL set on the bottom face of the container 14b as illustrated in (a) of FIG. 29. In this case the hand 22 does not interfere with the previously set object POBJ or the container 14b on the way to the release position ARL.

As illustrated in (b) of FIG. 29, the hand 22 grasping the new object OBJ can reach the release position ARL with no contact with the top face of the previously set object or the container 14b, completing the placement.

In handling an object using the expanded interference region ARIC, the control device 10 may place the new object with a gap or away from the previously set object, even though the hand 22 can place the object with no gap with the previously set object, without interfering the wall of the container 14b or the previously set object. In view of such a case, the control device 10 determines whether the gap can be reduced.

Theoretically, upon the premise that the new object OBJ be placed at a certain position, the control device 10 determines whether the hand 22 can be placed on the top face of the object OBJ without interfering with an obstacle such as the container 14b or the previously set object. Upon determining that the placement is possible, the control device 10 controls the hand 22 to place the object OBJ with no gap.

Figure 30A:
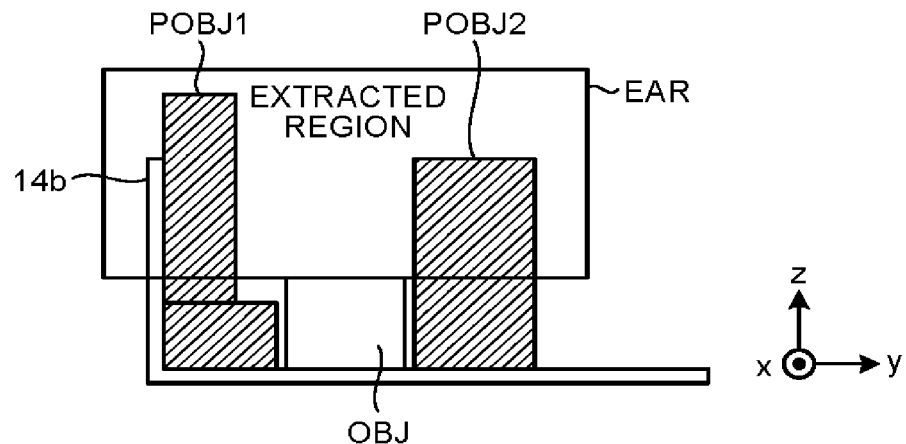
FIGS. 30A, 30B, and 30C illustrate a determination process as to whether the hand and obstacles interfere with each other in the expanded interference region.
Figure 30B:
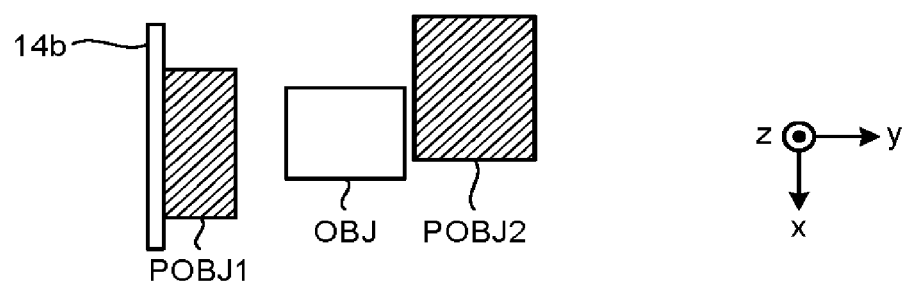
Figure 30C:
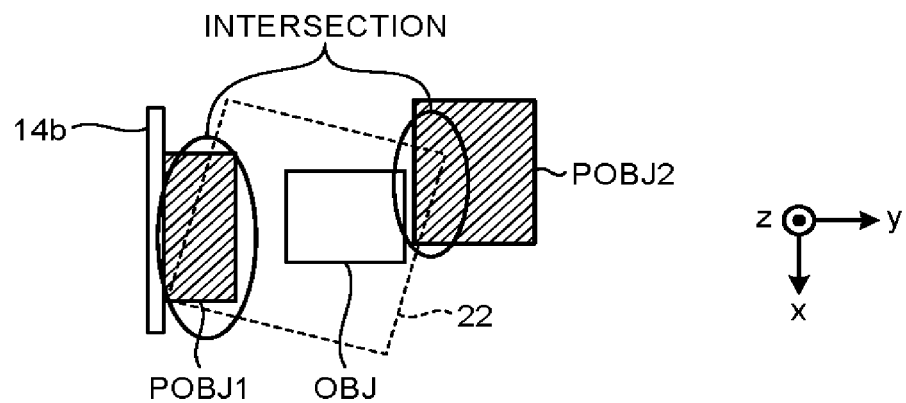

The following describes a process of determining whether the hand 22 interferes with obstacles while handling an object using the expanded interference region ARIC. FIGS. 30A, 30B, and 30C illustrate the process of determining whether the hand 22 and obstacles interfere with each using the expanded interference region.

As illustrated in FIG. 30A, the control device 10 sets, as an extracted region EAR of a cuboid shape, the region above the top face of the new object OBJ when placed at a predetermined placement position, on the basis of the information on the previously set objects POBJ1 and POBJ2 and the wall of the container 14b. Subsequently, as illustrated in FIG. 30B, the control device 10 extracts the outlines of the previously set objects POBJ1 and POBJ2 and the wall of the container 14b in the extracted region EAR when viewed from above.

The control device 10 then determines whether the interference region ARI1 of the hand 22 intersects or has a common region with the outlines of the previously set object POBJ1 and POBJ2 and the wall of the container 14b. Upon determining that the situation illustrated in FIG. 30C will not occur, i.e., that the interference region ARI1 of the hand 22 does not intersect with the outlines of the previously set objects POBJ or the wall of the container 14b, the control device 10 determines that the hand 22 can be set on the top face of the object OBJ without interfering with an obstacle such as the container 14b or the previously set object. Consequently, the control device 10 places the object with a decreased gap.

Figure 31A:
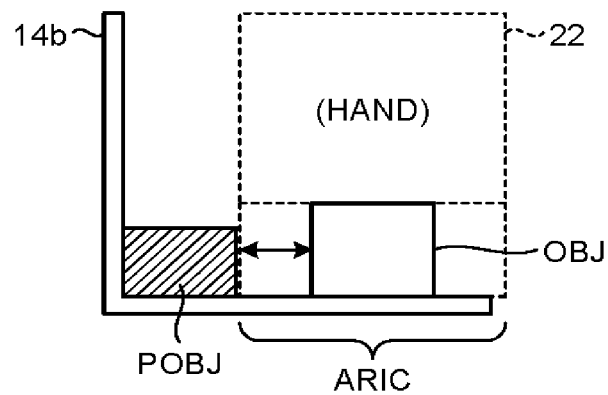
FIGS. 31A, 31B, and 31C illustrate a process of resolving a failure in the expanded interference region.
Figure 31B:
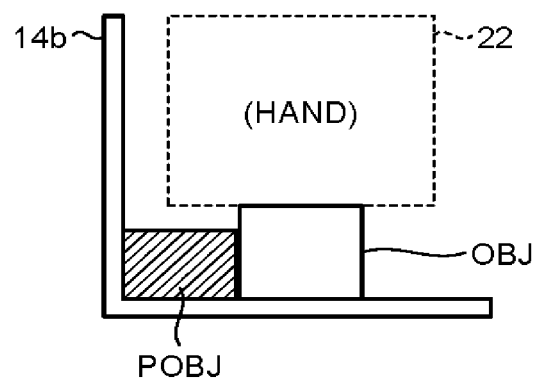
Figure 31C:
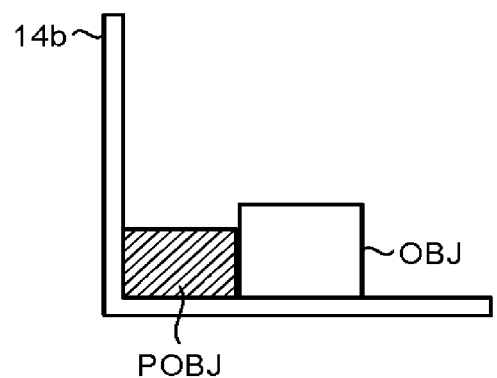

FIGS. 31A, 31B, and 31C illustrate a process of resolving a failure in the case of using the expanded interference region. To place the object OBJ using the expanded interference region ARIC as illustrated in FIG. 31A, there will be a gap between the object OBJ and the previously set object POBJ as indicated by the double-headed arrow in FIG. 31A.

In this case, upon the premise that a single object OBJ be placed adjacent to the previously set object POBJ as illustrated in FIG. 31B, the control device 10 determines whether the hand 22 can be set on the top face of the object OBJ as illustrated in FIG. 31C.

Upon determining that the hand 22 can be set on the top face of the object OBJ as illustrated in FIG. 31C, the control device 10 calculates the release position with no use of the expanded interference region ARIC, and eliminates the gap.

Referring back to FIG. 3, the release-plan generator 55 determines the release position RP and the release posture of the grasping object OBJ on the basis of the release information (Step S15).

The release-plan generator 55 calculates release-position scores together with the placement position of one object OBJ, to set a placement position with a highest release-position score to an actual placement position of the object OBJ.

The lease-position score is defined by a function including a release-method score and a sub-score as parameters, for example. Examples of the function include the following function:

Release-position score=Release-Method Score+0.1× Sub-Score

The release methods include a single object release in which the single object OBJ can be packed with no consideration of upside release or the expanded interference region, an upside release, and a release using the expanded interference region. The scores of the respective release methods are set as follows, for example.

Single object release: a release-method score of 0.3 (point)

Upside release: a release-method score of 0.2 (point)

Release considering the expanded interference region: a release-method score of 0.1 (point)

Examples of the sub-score include, but are not limited to, a natural-posture score, a pressing-plane score, and a free-space score, etc. The natural-posture score is such that the more natural the posture of the hand 22 is, the higher the score is. The pressing-plane score is such that the more aligned the directions of the object are (i.e., the objects face in the same direction), the higher the score is. The free-space score is such that the larger a free space behind the placed object is, the higher the score is.

The pressing-plane score is now described. To place identical objects OBJ in the container 14b, placing the objects OBJ in the same direction will improve the filling rate. In view of this, to place two or more identical objects OBJ in the same container 14b, the control device 10 selects the release position such that the objects OBJ can be placed in the same direction.

Figure 32A:
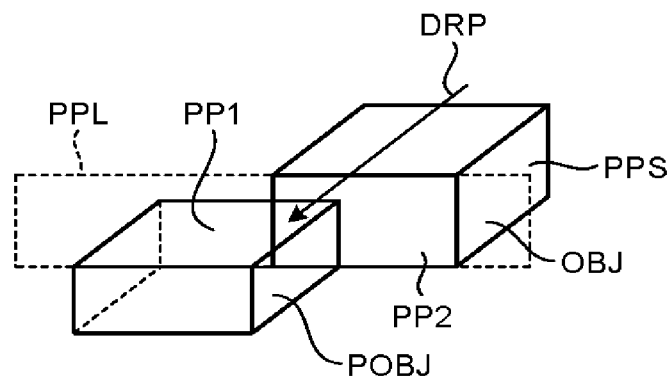
FIGS. 32A and 32B illustrate a process of aligning the directions of identical objects.
Figure 32B:
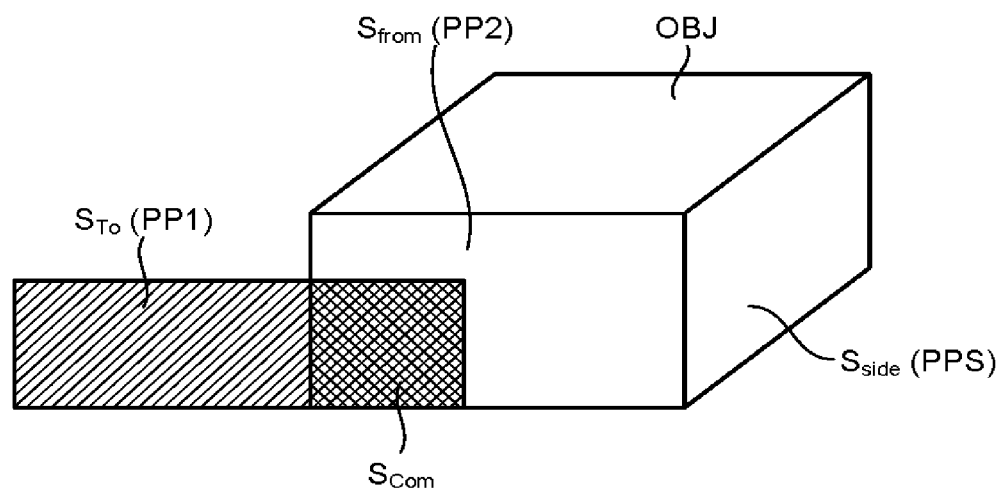

FIGS. 32A and 32B illustrate the process of aligning the directions of identical objects. The control device 10 according to the present embodiment calculates the pressing-plane score to evaluate the release position, as described later, and calculates the direction of the new object OBJ on the basis of the direction of the previously set object POBJ so as to increase the pressing-plane score. As illustrated in FIG. 32A, the new object OBJ is pressed onto the previously set object POBJ from a pressing direction DRP for placement.

The control device 10 extracts a pressing plane PPL, defined by the object OBJ pressed in the pressing direction DRP, on the basis of the placement information on the previously set object POBJ. With reference to the extracted pressing plane PPL, the control device 10 calculates the direction of the new object OBJ through the following processing.

In the following, as illustrated in FIG. 32B, a pressed area $S_{To}$ is defined as the area of a surface PP1 of the previously set object POBJ against which the new object OBJ is pressed. A pressing area $S_{From}$ is defined as the area of a surface PP2 of the new object OBJ pressing the previously set object POBJ. A pressing side area $S_{Side}$ is defined as the area of a side surface PPS of the object OBJ located in a direction intersecting the pressing direction DRP. A contact area $S_{Com}$ is defined as the area of contact between the previously set object POBJ and the new object OBJ. The control device 10 calculates the pressing-plane score SCR by the following Expression (1):

$$SCR = \frac{S_{Com}}{S_{From} + S_{Side}} \times \left(1 - \frac{|S_{From} - S_{To}|}{S_{From} + S_{To}}\right) \quad (1)$$

In the first term of the Expression (1) for calculating the pressing-plane score SCR, the sum of the pressing area $S_{From}$ and the pressing side area $S_{Side}$ of the new object OBJ is a fixed value. Upon the premise that the contact area $S_{Com}$ be constant, the pressing-plane score SCR will be maximal when the numerator of the fraction in the brackets in the second term of the Expression (1) is minimal, that is, when the difference between the pressing area $S_{From}$ and the pressed area $S_{To}$ is zero, i.e., when the pressing area $S_{From}$ is equal to the pressed area $S_{To}$.

In other words, the pressing-plane score SCR becomes maximal when the previously set object POBJ and the new object OBJ are oriented in the same direction. The contact area $S_{Com}$ between the previously set object POBJ and the new object OBJ becomes maximal when satisfying the following Expression (2):

$$S_{Com} = S_{From} = S_{To} \quad (2)$$

Thus, the contact area $S_{com}$ becomes maximal when the previously set object POBJ and the new object OBJ are juxtaposed to each other. Consequently, the pressing-plane score SCR is substantially maximal when the previously set object POBJ and the new object OBJ are juxtaposed in the same direction.

In the above example, the number of the previously set object POBJ is one. In the case of two previously set objects POBJ, the control device 10 calculates the pressing-plane score SCR for each of the pressing planes. With a largest sum of the pressing-plane scores SCR, the new object OBJ can be placed at an optimal placement position. In the above example, the previously set object POBJ and the new object OBJ are identical objects, however, the previously set object POBJ and the new object OBJ may be different objects. The same method can be applied to different objects as long as their placement positions are set by finding a higher pressing-plane score SCR. This makes it possible to determine the placement position so as to improve the filling rate.

The following describes the free-space score. FIG. 33 is a view for explaining the free-space score. (a) of FIG. 33 illustrates previously set objects in the container 14b at the time of planning how to place the new object OBJ.

As illustrated in (a) of FIG. 33, there are four previously set objects POBJ1 to POBJ4 in the container 14b. To place the object OBJ on the top face of the previously set object POBJ1, the control device 10 extracts a cubic space of a height ESPH which is from the top end of the container 14b to the bottom surface of the object OBJ (that is, the top face of the previously set object POBJ1) placed from above the container 14b. The control device 10 definer the space as an extracted space ESP. The control device 10 then extracts the previously set objects from the extracted space ESP.

In the example illustrated in (a) of FIG. 33, two previously set objects POBJ2 and POBJ3 are located in the extracted space ESP. As illustrated in (b) of FIG. 33 as the container 14b is viewed from above, the control device 10 extracts a region including no previously set objects and surrounded by the extracted, previously set objects POBJ2 and POBJ3, the object OBJ, and the container 14b. The control device 10 defines the extracted region as a vacant region VAR.

The volume of the free space can be found by multiplying the area of the vacant region VAR by the height ESPH. The control device 10 calculates the free-space score from the volume of the free space and the internal volume of the container 14b i.e., the total volume of an object placeable part of the container 14b by the following expression:

Free-space score=Volume of Free space/Internal Volume of Container 14b

Thus, the release-plan generator 55 calculates the free-space score and searches for the placement position of the object OBJ with a higher free-space score. As described above, to increase the free-space score, the volume of the free space can be simply increased. Consequently, the control device 10 effectively searches for the position of the object OBJ so as to ensure a vacant region as large as possible while avoiding placement of the object OBJ near the center of the container 14b.

To increase the volume of the free space, the object OBJ is preferably placed in as low a location as possible. In order to place the object OBJ in a lower location, the control device 10 effectively searches for the placement position of the object OBJ while avoiding vertical placement of the object OBJ on another object along the height.

Consequently, the release-plan generator 55 can search for the placement position of the object OBJ so as to achieve a higher filling rate.

After the release-plan generator 55 generates the release plan, the motion-plan generator 56 generates the robot motion information on the manipulator 20 moving from the present position to the release position RP and the release posture. In generating the robot motion information, the motion-plan generator 56 selects a high-speed motion in a region where it is not possible or less probable for the manipulator 20 to interfere or collide with an object other than the object OBJ, for example. Meanwhile, the motion-plan generator 56 selects a low-speed motion in a region where it is possible or relatively highly probable for the hand 22 or the object OBJ to interfere or collide with an object other than the object OBJ, such as in the situation that the hand 22 approaches or enters the container 14b, for example. The motion-plan generator 56 then determines a target value of force acting on the hand 22 in this region.

Referring back to FIG. 3, the robot controller 57 operates according to the generated robot motion information and controls the manipulator 20 and the hand 22 to move the object OBJ to the release position RP and release it at the release position RP (Step S16). In the periphery of the lease position RP of the object OBJ, the wall of the container 14b or an article of a sufficient size may be located. In this case, to place the object OBJ in the container 14b with higher density, the robot controller 57 controls the hand 22 to press the object OBJ against the surface of the wall or the article. In the case of the pressed surface being relatively largely inclined, the hand 22 releases the object OBJ by the applied pressing method and pressing force while pressing the object OBJ in close contact with the pressed surface.

After releasing the object OBJ, the robot controller 57 controls the hand 22 to move out of the container 14b and controls the manipulator 20 to be placed in a standby posture (Step S17).

The robot controller 57 performs gravity compensation for resetting the detected value of the force sensor 31, for example (Step S18). The detected value in this state is defined to be zero. In response to the determination of the grasp posture of the next object OBJ, the robot controller 57 control the manipulator 20 and the hand 22 to place the hand 22 in a calibration posture substantially the same as the grasp posture, and performs gravity compensation.

Subsequently, the integrator 51 determines whether to have received a conveyance instruction or handling instruction for the next object OBJ from the external device via the external I/F 71 (Step S19).

Upon determining to have received a conveyance instruction or handling instruction for the next object OBJ from the external device via the external I/F 71 at Step S19 (Yes at Step S19), the integrator 51 returns to step S2 and starts a series of control over the next object OBJ. Upon determining to have received no conveyance instruction for the next object OBJ at Step S19 (No at Step S19), the integrator 51 ends the series of control.

As described above, the object handling system 1 of the present embodiment can grasp and handle objects by an easily feasible and high-speed method without interfering with obstacles in the surroundings.

Figure 34:
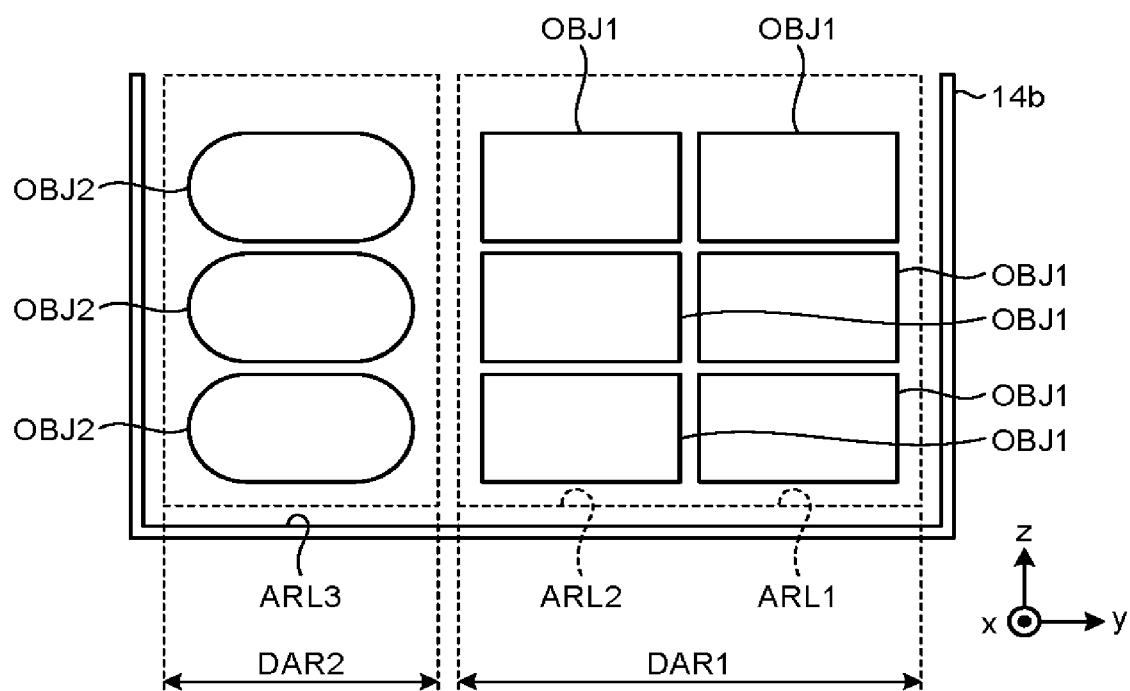
FIG. 34 illustrates an exemplary setting of placement positions of different objects and FIGS. 35A and 35B illustrate an exemplary setting of the placement positions, considering the position of the center of gravity.

The following describes a modification of the embodiment. FIG. 34 illustrates an example of setting the placement positions of different kinds of objects.

To place different kinds of objects OBJ1 and OBJ2 as illustrated in FIG. 34, release positions ARL1 to ARL3 are set such that the objects of the same kind are placed in the same area. Specifically, an area DAR1 is allocated to the objects OBJ1, and an area DAR2 is allocated to the objects OBJ2.

The release positions ARL1 and ARL2 of the objects OBJ1 are set in the area DART. The release position ARL3 of the objects OBJ2 is set in the area DAR2.

As a result, the objects of the same kind are placed at the same release position. This arrangement can improve the object filling rate of the container and prevent occurrence of a load collapse.

If there are multiple positions at which the new object OBJ can be placed, the control device 10 sets the placement position such that the position of the center of gravity of the objects in the container 14b is lowered.

Figure 35A:
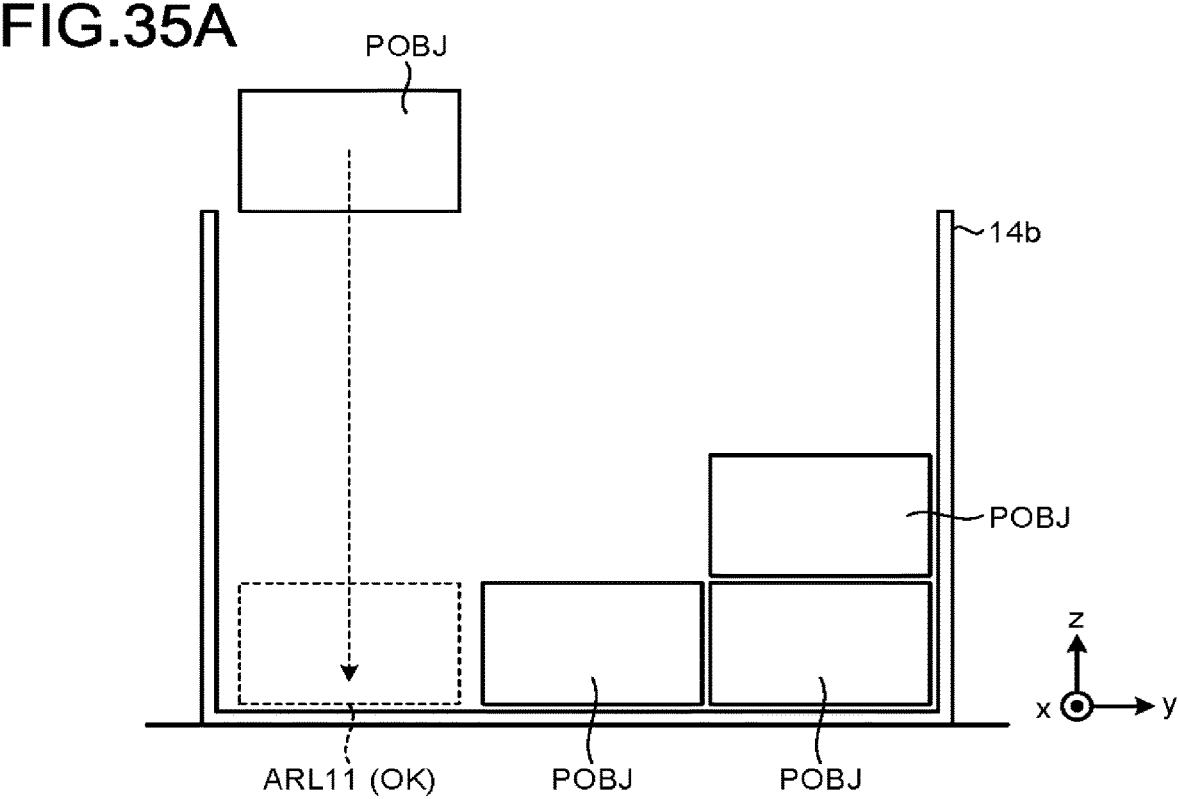
Figure 35B:
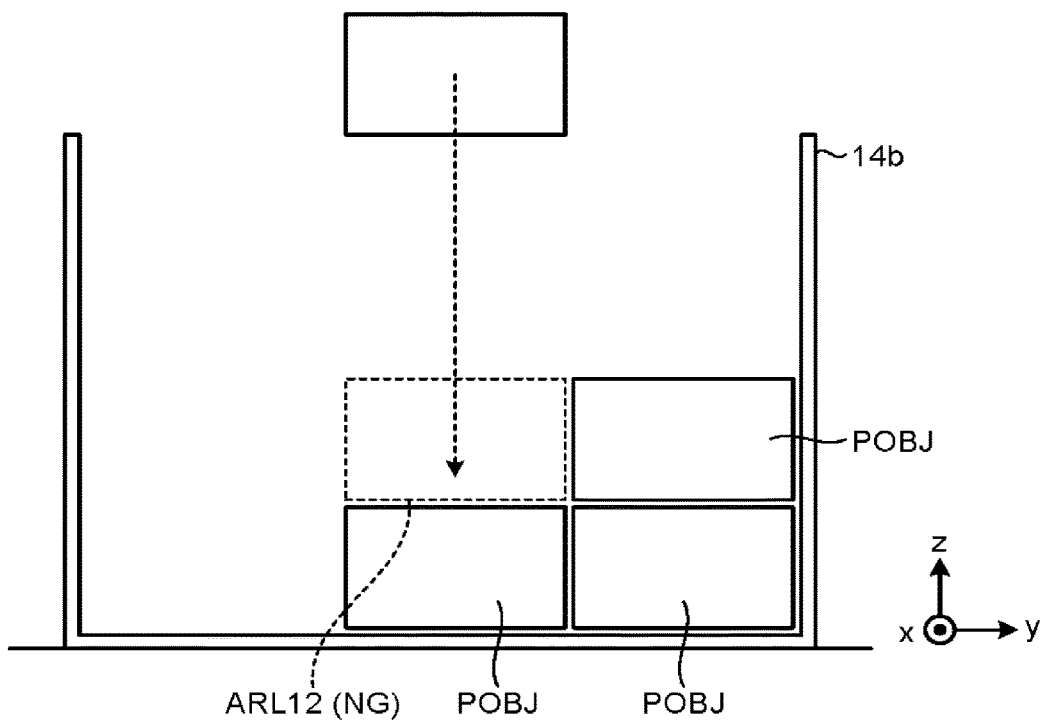

FIGS. 35A and 35B illustrate an example of setting the placement position, considering the position of the center of gravity. To set the placement position of the new object OBJ, there are a first release position ARL11 located on the bottom face of the container 14b as illustrated in FIG. 35A, and a second release position ARL12 located on the top face of the object POBJ previously set on the bottom face of the container 14b as illustrated in FIG. 35B. In this case, the center of gravity of all the objects in the container 14b after placement of the object OBJ is lower in position in FIG. 35A (OK) than in FIG. 35B (NG).

Thus, to set the placement position of the new object OBJ, the control device 10 preferentially selects the first release position ARL11, which allows the position of the center of gravity of the objects in the container 14b to lower, to the second release position ARL12. Placing the object OBJ at the selected position as above can improve the stability of the container 14b during conveyance or transportation and more effectively prevent a load collapse.

The control device according to the present embodiment and modification has a hardware configuration of a typical computer, including a control unit such as a central processing unit (CPU) or one or more processors, a storage device such as a read only memory (ROM) and a random access memory (RAM), an external storage device such as a hard disk drive (HDD) and a CD drive device, a display device such as a display, and an input device such as a keyboard and a mouse.

Computer programs executed by the control device according to the present embodiment and modification are recorded and provided in an installable or executable file format on a computer-readable recording medium, such as a compact disc read only memory (CD-RO), a universal serial bus (USB) memory, a semiconductor memory device as a solid state drive (SSD), and a digital versatile disc (DVD).

Computer programs executed by the control device according to the present embodiment and modification may be stored and provided in a computer connected to a network such as the Internet, by being downloaded via the network. Further, the computer programs executed by the control device according to the present embodiment and modification may be provided or distributed via a network, such as the Internet. The computer programs executed by the control device according to the present embodiment and modification may be incorporated and provided in a ROM, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An object handling device that causes a hand to grasp and transfer a cuboid object into a container, the object handling device comprising one or more processors configured to:
generate object information of a grasped cuboid object from an image obtained by imaging the cuboid object grasped by the hand, the object information including a shape of the cuboid object;
calculate a placement position of the object in the container on the basis of information on an obstacle in the container, an interference region of the hand interfering with another object, and an interference region of the grasped object interfering with the another object;
determine, based on the object information, whether an angle between a diagonal line on a side surface of the cuboid object and a vertical side of the side surface of the cuboid object is larger than a predetermined angle;
when the angle is larger than the predetermined angle, determine that the grasped object is a subject of upside release that has high physical stability and low possibility of tipping over when released from above; and
in response to the grasped object being the subject of upside release, calculate, as a release position of the grasped object, a position vertically above the placement position within a given distance.

2. The object handling device according to claim 1, wherein
the processors set the release position such that the grasped object is placed vertically directly above the placement position.

3. The object handling device according to claim 2, wherein
the processors calculate the release position such that the interference region of the hand does not interfere with the container or the obstacle in the container.

4. The object handling device according to claim 1, wherein
the processors calculate an amount of geometric or dynamic features of the object to release, calculate a distance between the placement position and a position of the object when released, and calculates a height of the release position for maintaining physical stability of the object after released.

5. An object handling device that causes a hand to grasp and transfer an object into a container, the object handling device comprising one or more processors configured to:
search for, to place a new object of a cuboid shape in the container containing a previously set object of a cuboid shape while pressing the new object against the previously set object on the basis of information on an obstacle in the container, two surfaces of the previously set object and the new object to become a contact surface such that an area of the contact surface is as large as possible and that a difference in area between the two surfaces is as small as possible; and
calculate at least a placement position among the placement position and a placement posture of the object in the container on the basis of a result of the search, wherein
the processors calculate a pressing-plane score SCR by the following Expression:

$$SCR = \frac{S_{Com}}{S_{From} + S_{Side}} \times \left(1 - \frac{|S_{From} - S_{To}|}{S_{From} + S_{To}}\right)$$

wherein $S_{To}$ represents an area of a pressed surface of the previously set object against which the new object is pressed, $S_{From}$ represents an area of a pressing surface of the new object pressing the previously set object, $S_{Side}$ represents an area of a side surface of the new object located in a direction intersecting a pressing direction, and $S_{Com}$ represents an area of contact between the previously set object and the new object, and
the processors search for two surfaces with a higher pressing-plane score SCR to be the contact surface.

* * * * *